US006974313B2

(12) United States Patent
Beaudoin

(10) Patent No.: US 6,974,313 B2
(45) Date of Patent: Dec. 13, 2005

(54) MULTIPLE INDUCTION ENERGY-DRIVEN ENGINE

(75) Inventor: Normand Beaudoin, Suresnes (FR)

(73) Assignee: Nivish SA, Luxemboueg (LU)

( * ) Notice: Subject to any disclaimer, the term of this patent is extended or adjusted under 35 U.S.C. 154(b) by 37 days.

(21) Appl. No.: 10/221,674

(22) PCT Filed: Mar. 14, 2001

(86) PCT No.: PCT/FR01/00753

§ 371 (c)(1),
(2), (4) Date: Aug. 27, 2003

(87) PCT Pub. No.: WO01/69061

PCT Pub. Date: Sep. 20, 2001

(65) Prior Publication Data

US 2004/0118375 A1 Jun. 24, 2004

(30) Foreign Application Priority Data

Mar. 15, 2000 (CA) .............................................. 2302870

(51) Int. Cl.[7] .............................. F04C 2/00; F01C 21/00
(52) U.S. Cl. ......................................... 418/54; 418/186
(58) Field of Search ................................... 418/54, 186

(56) References Cited

U.S. PATENT DOCUMENTS

| 2,362,542 | A | * | 11/1944 | De Lancey | ................... 74/640 |
|---|---|---|---|---|---|
| 3,459,367 | A | * | 8/1969 | Pfaff et al. | ..................... 418/54 |
| 3,913,408 | A | * | 10/1975 | Moore | ......................... 418/54 |
| 4,551,073 | A | | 11/1985 | Schwab | |
| 4,656,984 | A | | 4/1987 | Southard | |
| 5,322,425 | A | | 6/1994 | Adiwinata | |

FOREIGN PATENT DOCUMENTS

| DE | 27 21 641 | | 11/1978 | | |
|---|---|---|---|---|---|
| DE | 32 44 683 | | 5/1984 | | |
| DE | 35 27 227 | | 2/1987 | | |
| EP | 264490 A | * | 4/1988 | ............. F01C/1/22 |

* cited by examiner

*Primary Examiner*—Theresa Trieu
(74) *Attorney, Agent, or Firm*—Connoly, Bove Lodge & Hutz, LLP

(57) ABSTRACT

A multiple transmission energetic machine, comprising an engine block containing a cylinder into which a blade is inserted so as to partly rotate; and at least one assembly comprising a supporting kingpin, installed to rotate in engine block and each end of which is provided with a transmission shaft; a supporting gear mounted on each transmission shaft and rigidly connected to said engine block; transmission gears rotately inserted into said supporting gear, said transmission gears being mounted at each of said supporting kingpin to rotate in a side of said engine block and said transmission gears being provided, on a diameter thereof, with a means of attachment to the blade; and a compression device attached to said transmission gears so as to rotate partly in said cylinder.

11 Claims, 26 Drawing Sheets

MULTIPLE INDUCTION ENERGY-DRIVEN ENGINE

BACKGROUND OF THE INVENTION

When we take a close look at the concept behind conventional engines, whether they are of the cylindrical piston type, or of the rotary type, we soon see that the designers and the users have focused their production on conceptions aimed at the simplest structures, leaving it up to the transmissions and the differentials to deal with the more complex tasks of energy transmission, for instance, toward the wheels. We have searched for the same simplicity in the invention of the depositor for the "Energy Machine III", the subject of Canadian patent number 1.229.749.

The purpose of this invention is to demonstrate the shortcomings of such a way of thinking concerning the expenditure of energy. Indeed, single transmission engines substantially reduce the possibilities of the forms of movements of parts which, in internal combustion engines, will be required to produce the compression and expansion of gases, generating explosions and the dynamics of the engines.

Therefore, in the following pages, we present a set of oval (FIG. 8) triangular, rectilinear and other figures, which produce the moving parts of multiple-transmission energy driven engines.

It is to be first noted that conventional engines, principally piston and rotary engines, are examples of this trend to push design toward extreme simplification. These engines are activated dynamically by a single part, either the crankshaft for piston engines, or the crankshaft and an eccentric for rotary engines. Otherwise, the movement of the parts is static; in a conventional engine, the piston inserted in the cylinder follows a rectilinear path whereas, in a rotary engine, because the triangular piston is also submitted to anchoring at the engine end, its movement becomes almost elliptical.

In both cases, the primary geometrical figures obtained result in the production of power that is barely cost-effective because the torque, on explosion of the engine and within the successive fractions of seconds that follow, is relatively low compared to the energy being consumed.

The same applies with respect to our invention for the "Energy machine III" mentioned previously: we have opted for simplicity. In the more particular case of one of its embodiments, a blade is inserted so as to slide in and interposed rotating part, in a rotational manner, and off-centered in an engine block, in such a way that the ends almost touch the semi-cylindrical cage used as inlet and explosion chamber and consequently the cylinder of the machine. However, although this mechanism does offer the advantage of improving the engine torque, in addition to allowing the conventional valves to be removed, it has the shortcomings of producing too much friction and, accordingly, excessive wear between parts, essentially between the rings and walls of the combustion chambers, and then between the blade and the rotary hub in which it was inserted so as to slide.

SUMMARY OF THE INVENTION

The idea of the multiple-transmission engine idea was put forward as a means of resolving all these problems and to obtain the definite greater profitability of accepting more parts to obtain the movement of the engine. Indeed, we believe that this method is liable to offer a movement of the parts that is more original and likely to increase the torque while eradicating any induced friction surfaces. Accordingly, if the explosive power is increased, and if the power systems are simplified, everything leads us to believe that a fewer number of parts will be required for explosion, to obtain the same engine power. Consequently, conversely to the initial hypothesis, the total number of parts needed for constructing an engine with the same power will be smaller for a multiple-transmission engine than required in conventional engines. Furthermore, the engine dimensions will also be smaller.

Therefore, we began our process of thinking by considering what mechanism we could used to support the energy engine parts and eliminate friction.

We began thinking by taking a closer look at the movements of the blade end find aiming at connecting the mechanism at either end, if we can produce the desired mechanical effect. By investigating the movement of the ends with respect to one another, we first observed that their movement goes through two phases opposite to one another, an acceleration phase and a deceleration phase. Accordingly, when one end enters its deceleration phase, by compensation, the other end begins its acceleration phase.

This gave us the following geometrical idea: if a circumference can be made to rotate about another circumference having the same size, and if we follow the movement of a fixed point on the first circumference through one complete revolution, and therefore one pivoting action, then this point will accurately describe the desired form, i.e., the shape through which the blade end travels (FIG. 2).

From the mechanical point of view, we assumed that gears would materialize the circumferences. Since the movement described above is that of one end of the blade, and that the blade has two ends, two rotary circumferences would be necessary in the form of gears. Accordingly, we are able to propose an initial embodiment of the invention (FIG. 3) by imagining that the two gears, replacing the pivoting circumferences—which we will refer to as the transmission gears—are mounted so as to rotate at either end of a pivoting part—which we will call the transmission support—which is mounted so as to rotate in the engine housing. The two transmission gears, of the same size, are then interleaved with a gear, itself being of the same size—which we will refer to as the supporting gear—connected rigidly to the engine centre. In this way, if both ends of the blade are connected to anchor points on the transmission gear diameter seen that the blade describes very accurately the movement that we were seeking and that, consequently, all induced friction is eradicated and that it is no longer for it to be inserted into a core, as was previously necessary.

In FIGS. 4 and 5, a blade is shown successively in its explosion and expansion phase. Initially, the two interconnecting points of the gears are simultaneously at their lowest point. In this position, the combustion chamber is reduced to the minimum and the gases are ready to explode whereas, on the other side of the blade, the inlet chamber is increased to its maximum. Then, the arrangement of these parts is shown a quarter turn earlier (FIG. 5), when the interconnecting points are both at their highest level. We then verified whether this method of proceeding was simply an alternative of a more general idea. That is why we first wanted to demonstrate the variants of this idea before demonstrating its other particularities.

Accordingly, whereas in the first embodiments not only were the transmission gears of the same size as each other, but it will be remembered that they were of the same size as the supporting gear. In the subsequent embodiments, the sizes of the transmission gears are different from those of the supporting gears.

We obtain a different arrangement if we assume that the transmission gears are twice as small as the supporting gear. In this case, the figure produced by a point on the transmission gear has a same shape as illustrated in FIG. 6. In this case, each of the transmission gears is connected to a given part, triangular in shape, and we obtain an engine whose movement, similar to that of a rotary engine, however produced in a totally different and far more profitable way. Indeed as will be shown more extensively in the detailed description of the figures, the rising of the parts produces what could be referred to as a mechanical contradiction, a sort of locking action, which systematically prevents the parts from descending back toward the rear. Therefore, during the explosion, the thrust on one side of the triangle is not partially cancelled by the other part of this side because the mechanical locking action does the work. Instead of benefiting as a result from only one-third of the thrust, we obtain rather two times more, i.e. two-thirds of the available thrust (FIG. 9).

A third embodiment of the invention is obtained when we establish a ratio of one in three between the size of the transmission gears and that of the supporting gear. The shape obtained is semi-triangular (FIG. 10) and a blade is attached to the two transmission gears: in this case, the shape of the engine obtained is similar to a cloverleaf.

Subsequent shapes can be obtained depending on whether the gears are in a ratio of one in four, one in five etc. Conversely, if there is only one gear, the shape of the movements will be oval and a conventional piston may be attached to it.

In each figure produced, we can provoke concave or convex movements depending on whether blade pistons or triangular pistons are attached inside or outside the circumferences, as shown in FIG. 22.

Similarly, if the adjustment of the attachment points between the blade and the supporting gears do not match, it will be seen that the distance between this point will vary by oscillating throughout the movement. This method could make it profitable to use a flexible piston.

Up until now, we have generalized part of the invention by demonstrating the notion of multiple-transmission using external gears.

Interesting shapes can be obtained by using, now, as opposed to external gears only, as mentioned previously, two sets of external and internal gears.

In this case, it will be more particularly a matter of inserting external type transmission gears into internal supporting gears.

Among the interesting figures created in this way is that of the triangular engine. Indeed, it can be assumed that two identical transmission gears are attached, as in the first case on a rotating basis upon a rotary support, with smaller gears, in a ratio of one to three, on an internal supporting gear into which they are inserted. A blade will then be attached to the anchor points of the transmission gears. Accordingly, it will be seen that this blade describes a movement in such a way that the ends can, at any time, follow the walls of a triangular cylinder in which it moves, while increasing and decreasing in turn the combustion and inlet chambers.

This way of operating could very certainly be the origin of what we might be tempted to call a three-stroke engine, in which an additional stroke would be inserted between the two strokes of the two-stroke engine. This would be an air integration stroke, expelling burned gases, which would then be replaced by new gases. Accordingly, the old gases would never be able to enter the combustion chambers again, and likewise, no new gases would be evacuated during the exhaust process.

If a single transmission gear is used, the movement obtained is absolutely rectilinear and may be linked with a two-head piston (FIGS. 14, 15).

So far, we have demonstrated how multiple-transmission engines could be built using external or internal gears.

Another variant of the invention could be considered if we assume in this case the multiple-transmission of the main parts (blade or triangular piston) by the use of a different type of transmission, i.e.: gears and crankshaft for instance.

Two different embodiments can be obtained depending on whether the crankshaft movement is or is not in the same direction as that of the blade or the triangular piston.

First, we need to produce a blade at the centre of which the eccentric of a crankshaft will be inserted (FIG. 18). Then, in a crankpin arranged to be diametrically opposed to the eccentric and which will be used as a transmission support, it will be necessary to insert on a rotational basis, a stem on which external gears will be mounted on each side, in this case, transmission gears. The external gear will be inserted into an internal gear mounted rigidly in the side of the engine. The transmission gear located on the inside will be inserted in a second internal gear arranged rigidly on the blade side. Accordingly, if the inside transmission gear is twice as large as the outside transmission gear, or yet again, if the internal supporting gear is twice as small as the external supporting gear, then the movement of the blade will be two times slower than that of the crankshaft.

Accordingly, the result will be somewhat original in that it will produce the same travel as in the previous methods.

The same applies to the triangular piston, which, in this way, will describe the same figure as in the case of it being supported by two transmission gears.

However, investigation can be taken further, using this multiple-transmission variant again: gears and crankshaft. However, this time, the movement of the blade will be reversed with respect to that of the crankshaft, by means of a pinion. This time, we will obtain the rotation of parts similar to that produced by the triangular engine (FIG. 13). Indeed, it can be assumed that we have a blade in which the eccentric of a crankshaft is inserted so as to rotate. Then, rigidly on this crankshaft, we will mount a supporting gear itself inserted into a swivel gear mounted to rotate in the engine block. Then, it can be imagined that this swivel gear will be coupled with a side transmission gear mounted rigidly in the side of the blade.

In this way, the blade will move in the opposite direction to the eccentric and the crankshaft and in accordance with the rotation proportions i.e.: if the crankshaft turns at the same speed or twice as fast but in the opposite direction, we will obtain an engine whose cylinder is elliptical in shape or, yet again, and differently, an engine whose cylinder is triangular in shape.

Among the interesting spin-offs of this method, in which the eccentric of a crankshaft serves as a second support for the multiple-transmission system, there is the idea of cutting the blade or triangular piston differently so that the eccentric is allowed to come directly into contact with gases on explosion. This method could produce maximum torque in this case.

Now we have to deal with a final point, the transmission of the power toward the outside the engine.

Naturally, this can be induced by the crankshaft. Otherwise, it can be induced by the support shaft, which does not turn at the same speed as the crankshaft, or under the same speed as the blade (FIG. 24). A gear can be connected rigidly to the support shaft under output shaft can be inserted into this shaft to convey the power to outside the machine.

Finally, because the blade or the piston have an oscillating effect, it might also be possible to mount rigidly, in the side, an internal gear coupled with an external gear attached rigidly to a shaft. In this case, this shaft will convey the energy toward the outside.

BRIEF DESCRIPTION OF THE FIGURES

The second part of the figure involves embodiments of multiple-transmission engines but in this case, not obtained only by external gears but also involving internal gears.

FIG. 18 represents a multi-inking engine in which one of the two gears is a crankshaft while the other is a gear. An additional kingpin mounted on the crankshaft will serve as supporting shaft, which, through the use of a transmission shaft, will introduce the specific movement of the blade with respect to that of the crankshaft. Here, the movement of the blade will be induced in the same direction as that of the crankshaft.

DETAILED DESCRIPTION OF THE FIGURES

Figure 1:
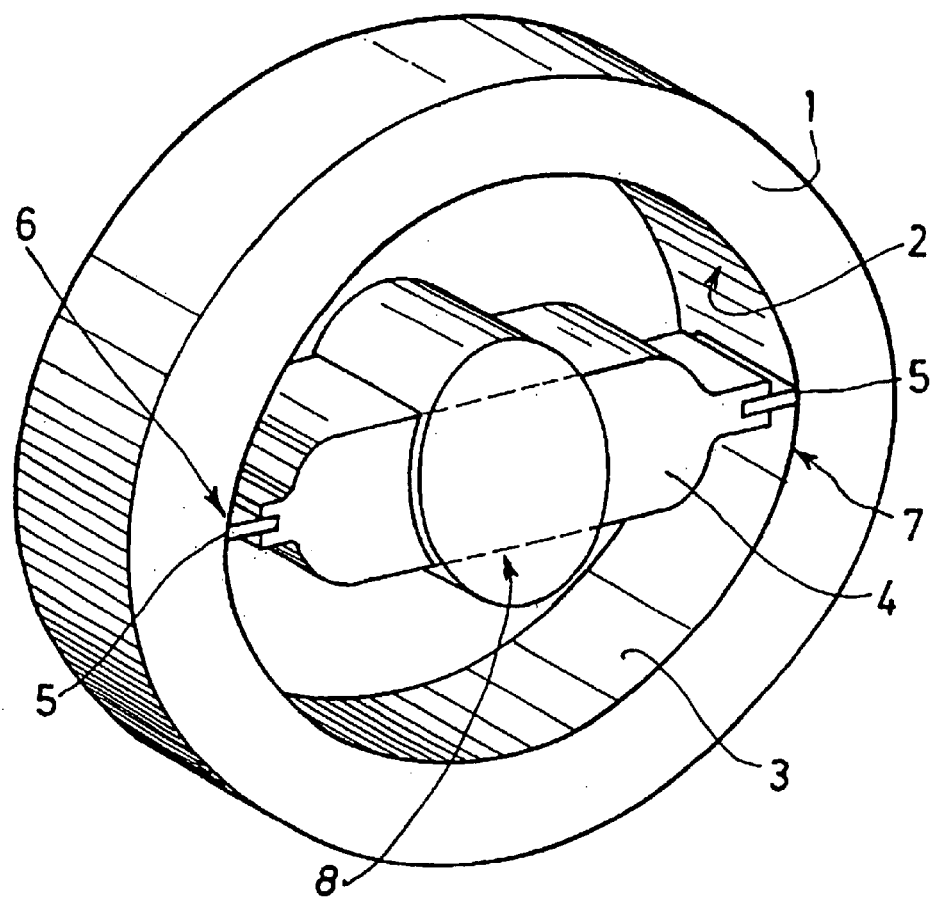
FIG. 1 (PRIOR ART) shows main friction points whereby the depositors designed supporting mechanisms to eradicate these friction points.

FIG. 1 is a reproduction of Figure VI of the invention by the depositor for an "Energy Machine III", covered by Canadian patent number 1,229,749, filed on 18 Mar. 1985 under number 476,720, issued on 15 Dec. 1987.

FIG. 1 shows an engine block 1, a cylinder 2, a rotary core 3 arranged to rotate in the cylinder 2, a blade 4 inserted to slide in the core 3 and rings 5 inserted to float at each end of the blade 4. It can be seen that main friction points are located between the rings 5 and the cylinder 2 because the output of one blade end is activated by the thrust of the other end against the surface of cylinder 2. A second friction point 8 consists of the part situated between the blade 4 and the core 3. The thrust of the gases against the blade 4 establishes a force contrary to that of the resistance of a crankshaft to which the rotary core 3 is attached, generating this friction.

Figure 2:
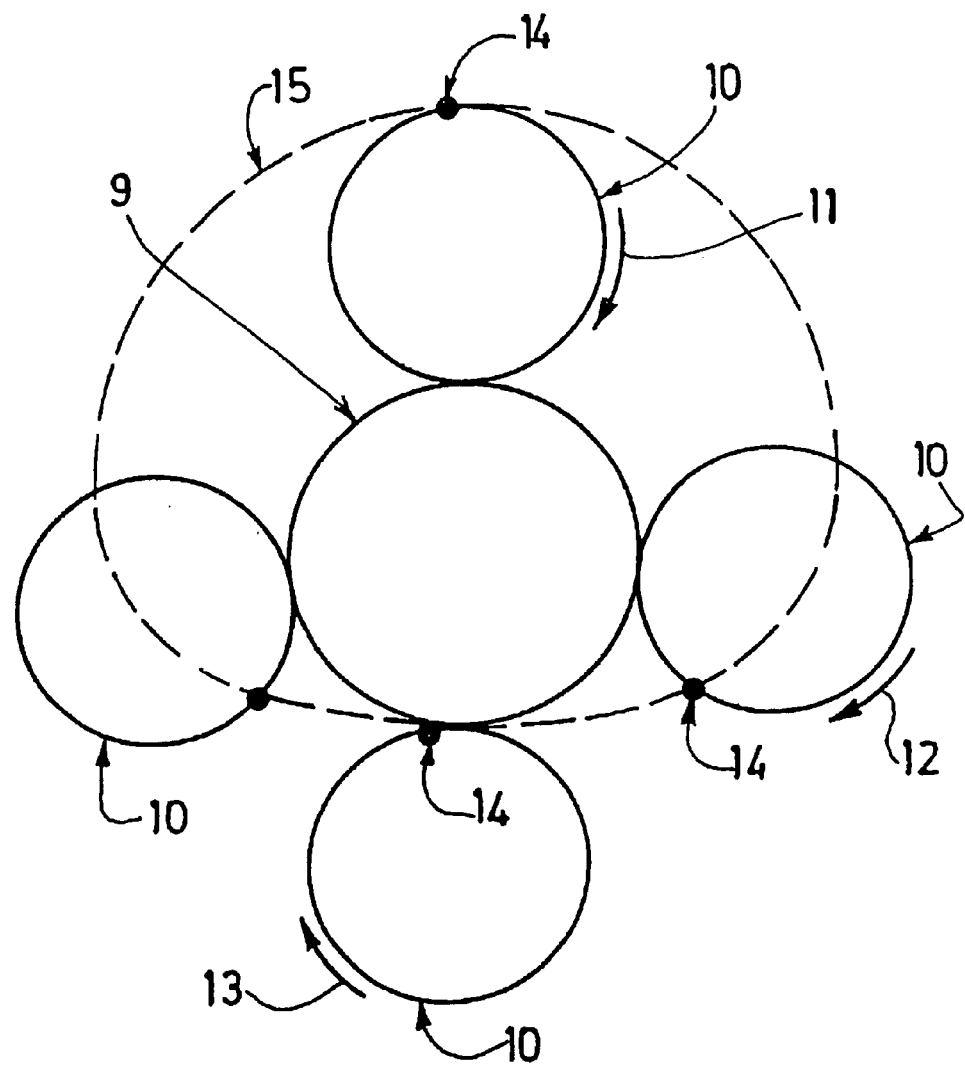
FIG. 2 is a diagram of two circumferences, the first fixed and the second rotating about the first, where the path covered during the rotation of the second circumference, by a point located on the latter, can be seen; the path taken by this point produces an almost circular form corresponding exactly to what the depositor wanted, that is, to be similar to the path taken by the ends of the blade.

FIG. 2 shows a fixed circumference 9 and a rotary circumference 10. The swiveling of this rotary circumference 10 can be seen in three different steps (see arrows 11, 12, 13). If we assume that this rotary circumference is at a fixed point 14, through its displacement, we can draw the path that the point will take after one full rotation about the supporting circumference. This gives an almost circular form, corresponding to the form desired.

Figure 3:
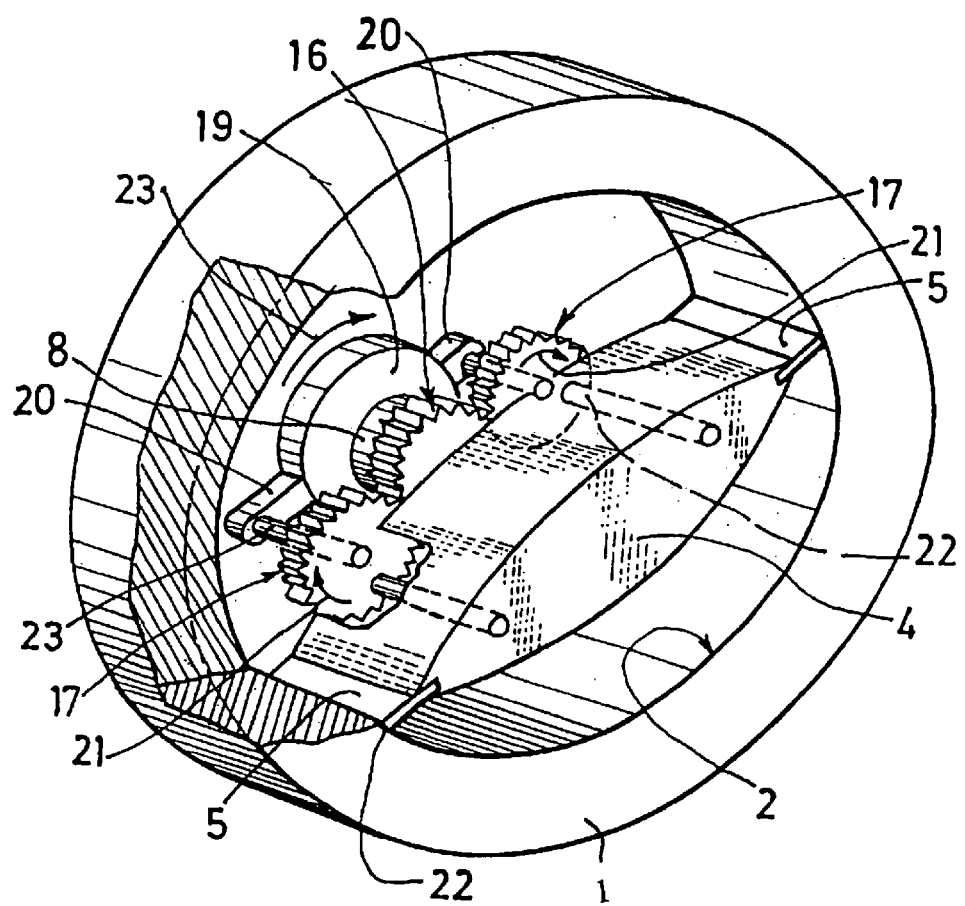
FIG. 3 shows a motor whose mechanicals are a materialization of the geometry previously indicated in FIG. 2. Here, the circumferences are replaced by gears. Indeed, two gears, referred to as transmission gears, are inserted so as to rotate in a gear, referred to as the supporting gear, attached rigidly to the engine. These two transmission gears are held by a support mounted to rotate in the side of the engine. The blade is attached by a means to these transmission gears. Accordingly, the blade describes the movement as desired. In this figure, the parts are situated during inlet and expansion.

FIG. 3 represents a diagonal view of a multiple-transmission machine the mechanism of which is a materialization of the geometry shown in the previous Figure. Here, the fixed and rotary circumferences have been replaced by gears, respectively supporting gears 16 and transmission gears 17. More specifically, a supporting gear 16 is connected rigidly to the engine block 1, indirectly by attachment to a fixed shaft. Around this fixed shaft, between the engine side and the supporting gears 16, a device will be assembled to support the transmission gears 17 and which will be referred to as supporting crankshaft 19. Each end of the supporting crankshaft 19 will be provided with a supporting kingpin 20 which will be provided with a device, such as a shaft 23, to which the transmission gears 17 will be attached in such a way as to rotate. The transmission gears 17 mounted to rotate at the end of each supporting kingpin 20 will be arranged so that they are also inserted into the transmission gears 17; accordingly, during the rotation of the supporting crankshaft 19, the transmission gears 17 will be forced to turn about themselves (see arrow). Each of the transmission gears 17 will be provided in turn with a device such as a transmission shaft 22, attaching it in the semi-rotational manner to the blade 4. Accordingly, the blade 4 will be driven inside cylinder 2 and will be supported at all times in such a way that the rings 5 inserted at either end of the blade 4 may be floating, and fit without any induced frictions against the walls of the cylinder 2 of the engine.

Figure 4:
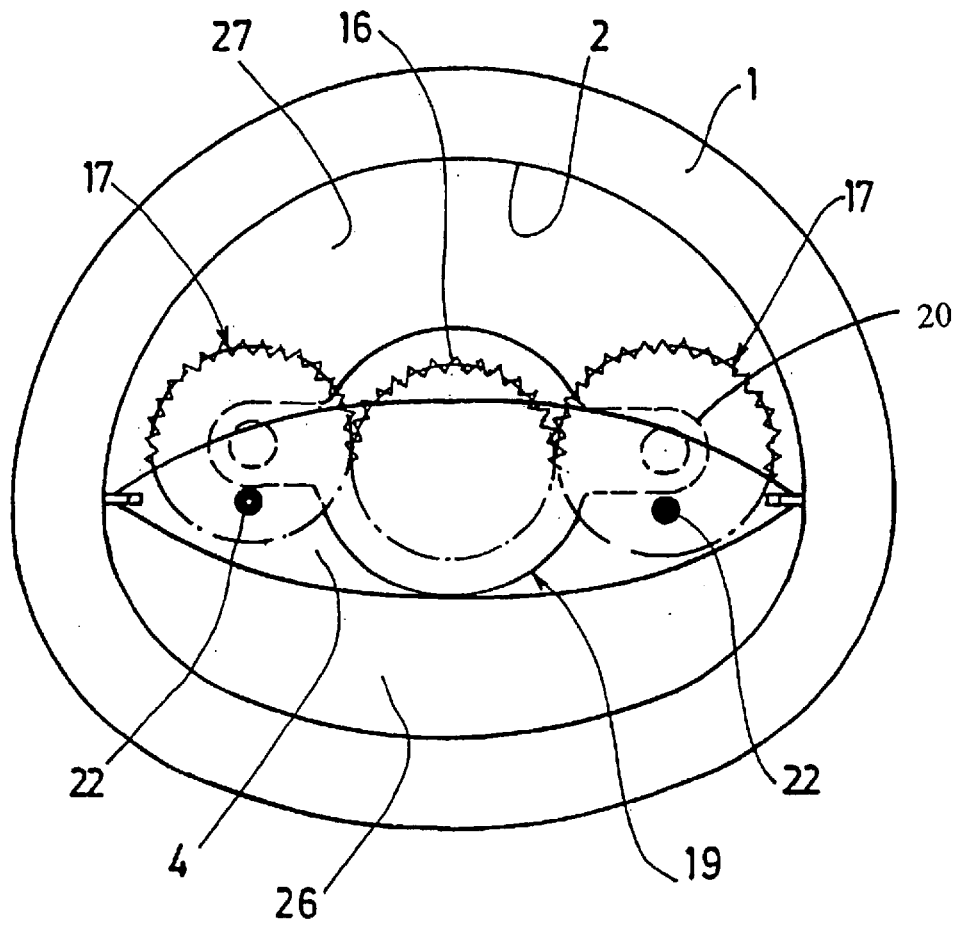
FIG. 4 shows a transversal section of an engine similar to that of FIG. 3 but whose parts are in the explosion phase and at the end of inlet.

FIG. 4 shows a transversal section of an engine similar to that of FIG. 3 and whose parts have been placed, depending on the side of the blade 4 being referred to, either in the explosion phase or in the end of inlet phase. More specifically, in this figure, the body of machine 1 in the end of inlet phase. More specifically, this figure shows that the body of machine 1 contains a conical chamber. Two transmission gears 17 mounted to rotate at the end of the supporting kingpins 20 are inserted into supporting gears 16. Each part of the blade 4 is attached to a transmission shaft 22 mounted on the supporting gears 16. In this figure, the two transmission shafts 22 reach the lowest point of their path at the same time and, accordingly, the blade is brought into a horizontal position while gas chamber 26 is compressed to the minimum, permitting explosion to take place. Conversely, on the other side of the blade 4, the opposite happens because the inlet chamber 27 is distended to its maximum meaning that we have reached the end of gas inlet.

Figure 5:
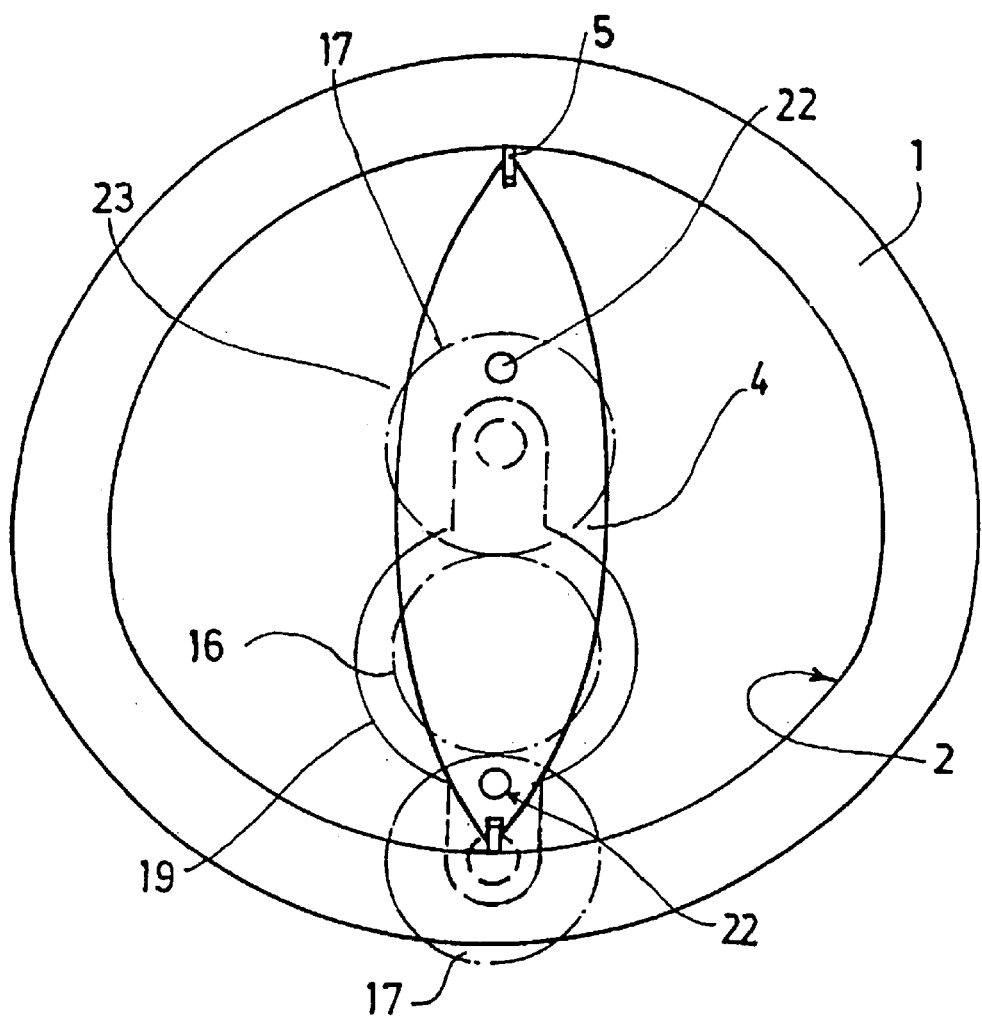
FIG. 5 is a similar view to the previous one but the parts have been placed in a position halfway along the path between the two pistons.

FIG. 5 is similar to FIG. 4 but the parts are midway between the two positions. It will be seen that unlike the previous figure, the transmission shafts 22 are both at their highest level at the same time,—simultaneously with the blade 4 being found in a vertical position.

Figure 6:
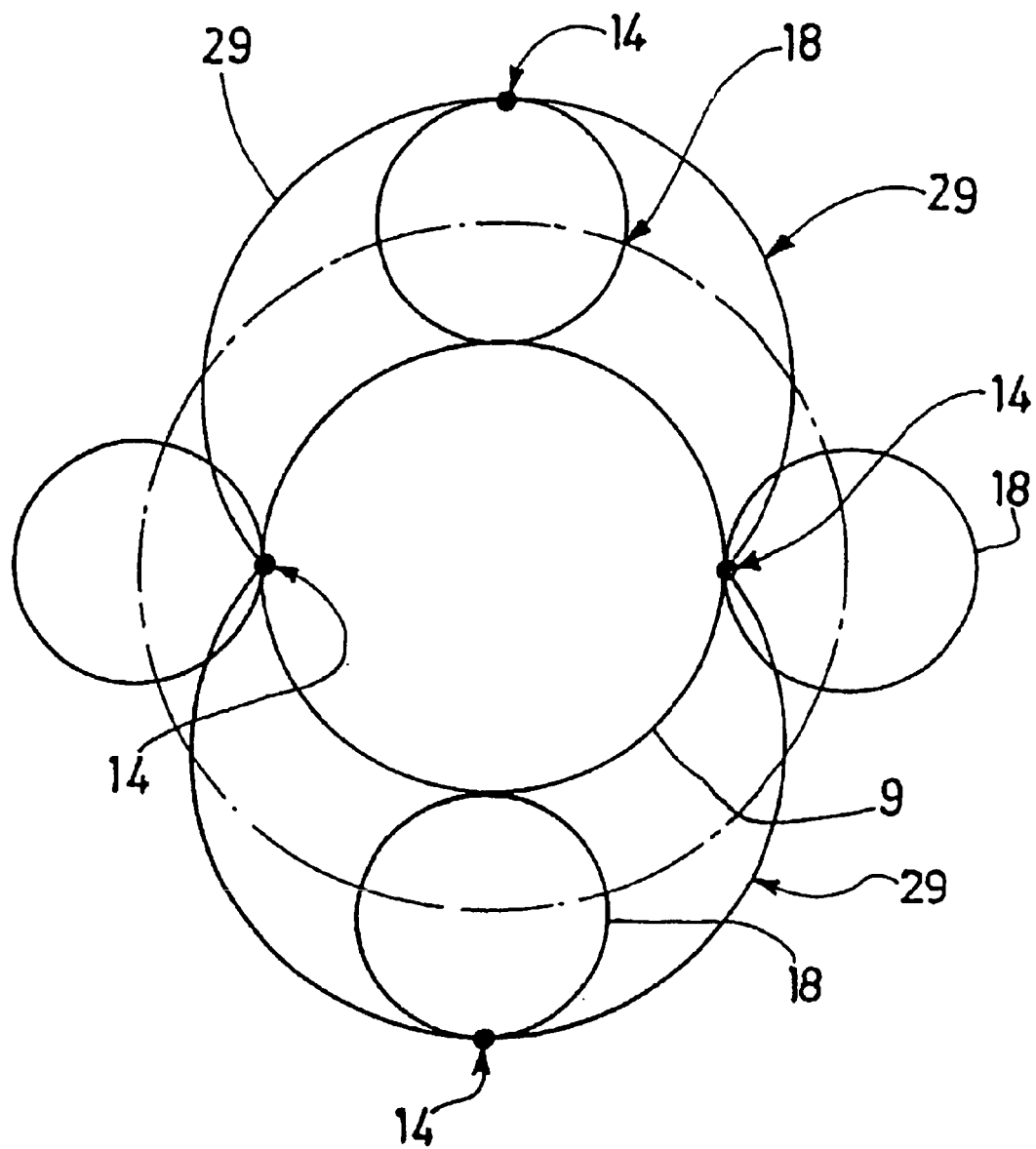
FIG. 6 shows a geometrical form of one embodiment of multiple-transmission in which the transmission circumferences are twice as small as the supporting circumferences.

FIG. 6 represents a geometrical form prior to the attainment of multiple-transmission in which transmission circumferences 18 are twice as small as the fixed circumference 9. In the same way as for the previous embodiments, it must be assumed that the transmission circumferences 18 turn by swiveling about the fixed circumference 9. The form described by a point 14 on one of these transmission circumferences 18 will be similar to that of a figure of an eight.

Figure 7:
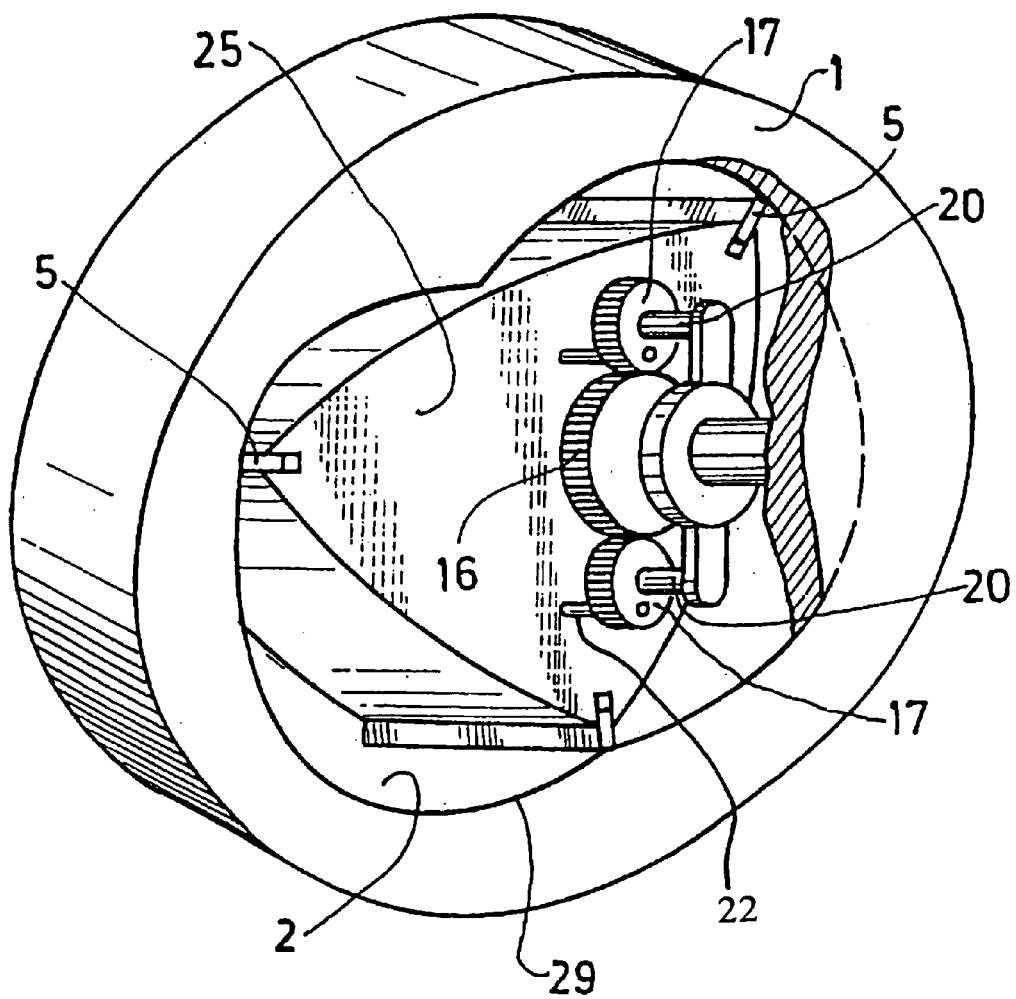
FIG. 7 is a materialization of the geometry of FIG. 5. Here, it can be seen that the blade is replaced by a triangular piston. Notes that even if the piston is triangular, the engine can be constructed with a double support. The result is that the supporting shaft to which the piston is rigidly attached will not be in a similar position during each of the explosions. Here, the supporting shaft is centered accurately with respect to the explosion surface at the time of the explosion.

FIG. 7 is a materialization of the geometry of FIG. 5. The engine is shown from the gear side to better display its operation. In the same way as the previous embodiments, two transmission gears 17 are mounted to rotate at the ends of kingpins 20, which rotate in such a way that they are simultaneously inserted into a supporting gear 16. Here, the transmission shafts 22 are connected more specifically to a triangular piston 25 replacing the blade 4 of the previous figures. Each corner of this piston 25 will be provided with floating rings 5 which, at all times, will follow the movement of the piston 25 and the figure of an eight of the cylinder. Similarly, it will be seen that if the piston 25 is triangular, it will be possible to obtain a double support engine. Accordingly, a transmission shaft 22 to which the piston is rigidly attached will not be in a similar position on each of the explosions. In this case, the transmission shaft 22 is indeed centered on the explosion surface during explosion.

Figure 8A:
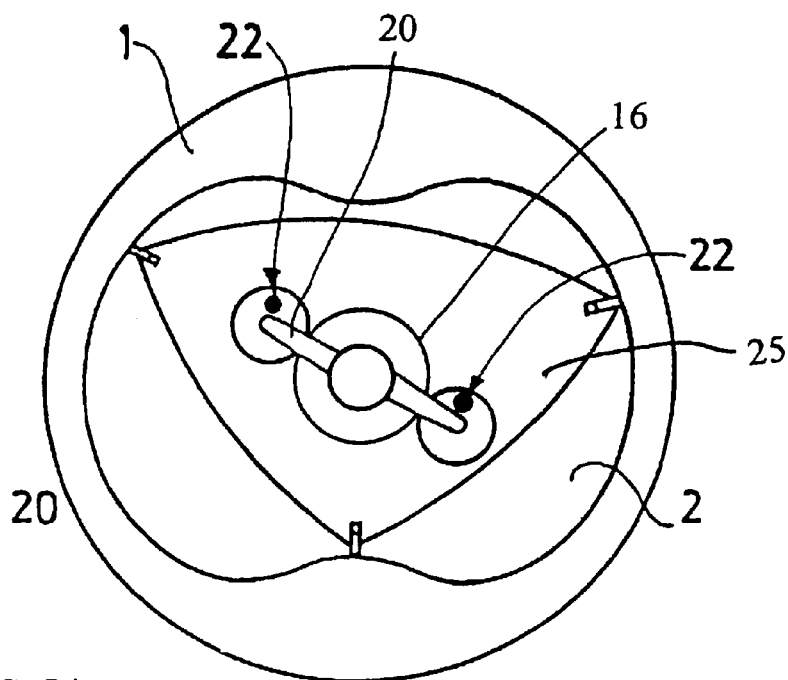
FIG. 8 shows an engine similar to that shown in the previous figure but during a subsequent explosion where it will be seen that the supporting shaft is in a different position so that each gear is at its maximum elevation at the same time. The shape described by a point placed on these swiveling and rotating circumferences is similar to that of a FIG. 6. Each point of the triangle adheres constantly to the entire surface of the cylinder, which has the shape of a FIG. 7.
Figure 8B:
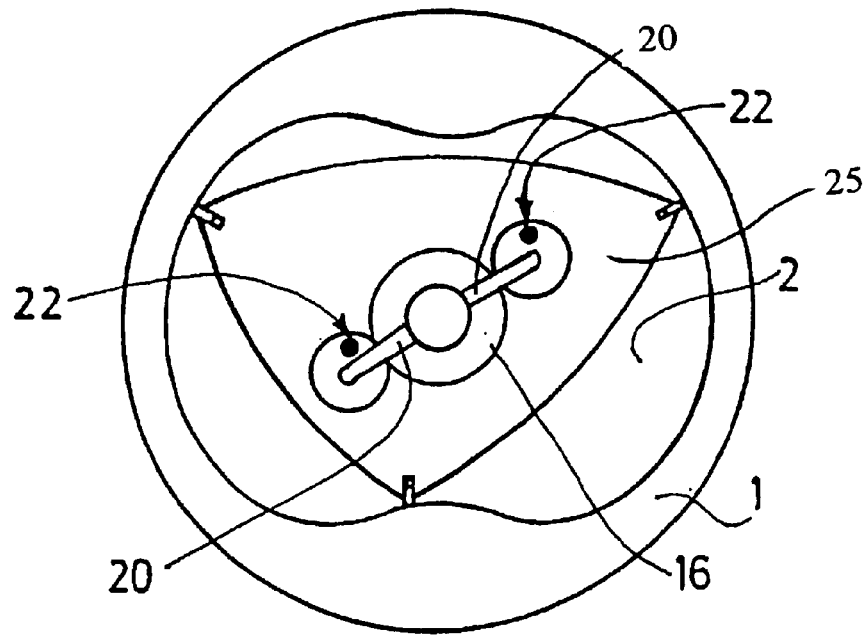

FIG. 8 figuratively depicts the position of the parts in the two subsequent explosions. It will be seen that even if the transmission kingpins 20 are not vertical, the two transmission shafts 22 will be at their highest level, permitting, even if disymmetrically, the second and third faces of the triangular piston 25 to reach their highest point.

Figure 9:
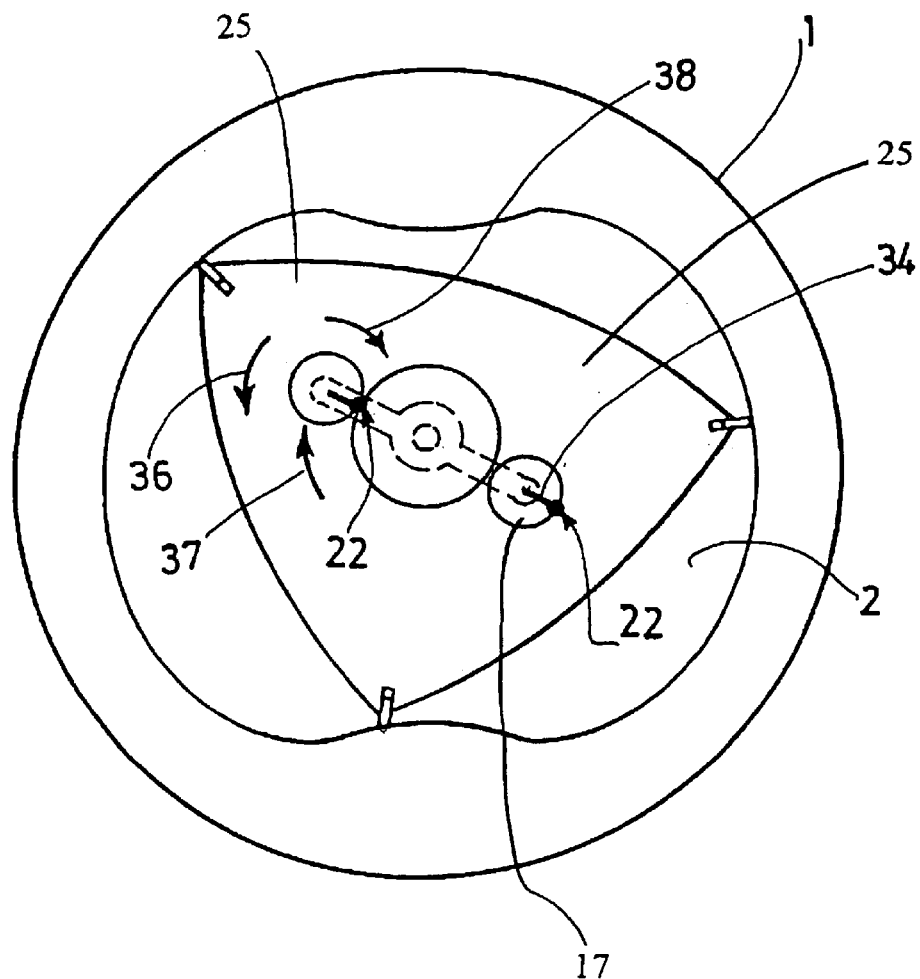
FIG. 9 shows an engine similar to those of the two previous figures but in which the parts have been placed in the expansion phase.

FIG. 9 shows a similar engine to those of the two previous figures but in which the parts have been placed in the expansion phase, that is, between two explosions. It can be seen that the transmission shafts 22 are in a lateral position, permitting the engine torque to be generated. It will also be seen, and this is particularly important in terms of torque, that an anti-torque device is normally on a side opposite the movement of the parts and that a negative thrust thus generated is eradicated by a locking mechanical key produced by the lifting of the transmission gear 17 on the left. Indeed, the opposed directions of movement (see arrows 36, 37 and 38) form a mechanical contradiction working like a natural anti-return of the triangular piston 25. Indeed, the left-hand part of the piston 25 is naturally affected by the anti-return mechanical locking and no longer needs compensation on the other side of the torque. Therefore, the engine torque is doubled because there is no expenditure of energy needed to cancel out a counter-torque.

Figure 10:
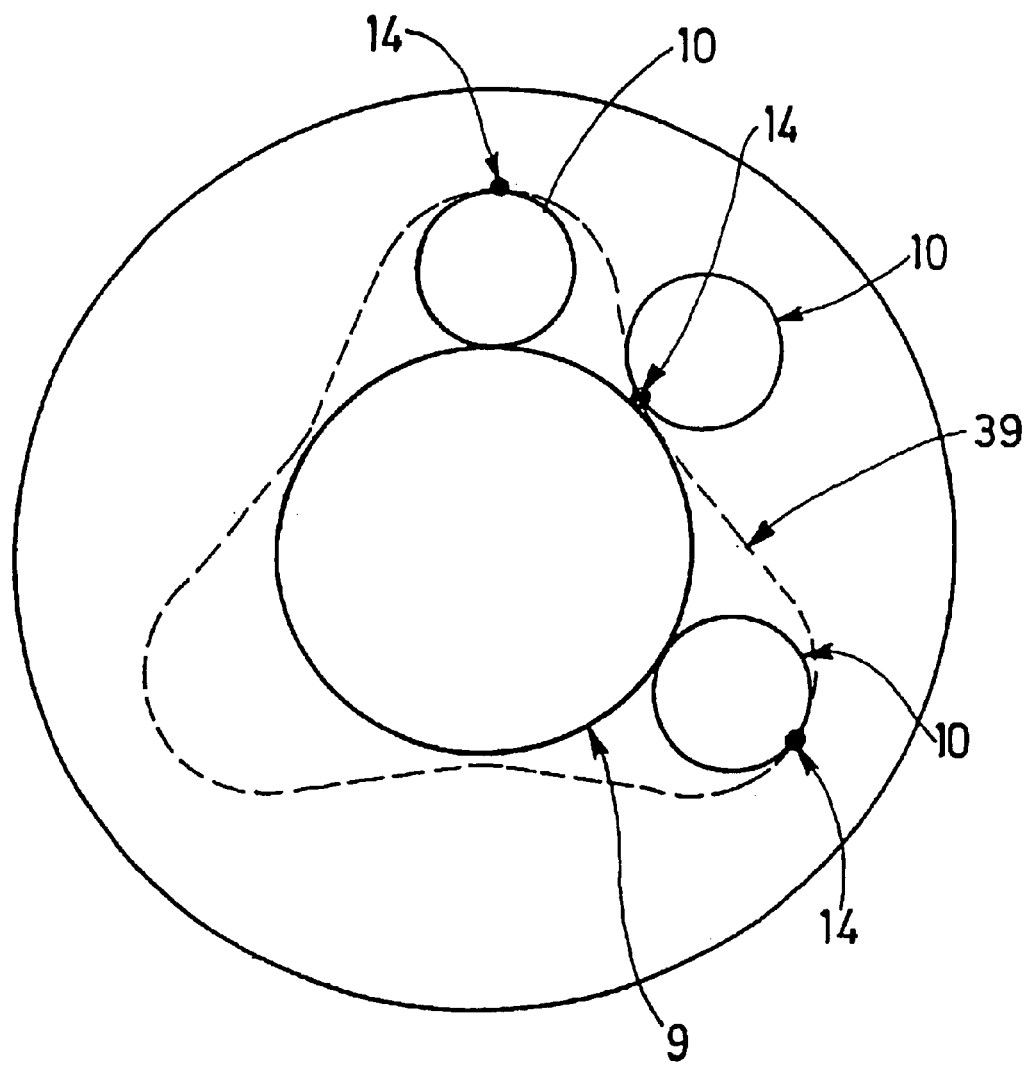
FIG. 10 shows the geometrical shape obtained by the transmission circumferences, which, this time, are three times as small as those of the support. The shape of the movement obtained will then be similar to that of a cloverleaf.

FIG. 10 represents a geometrical form attained by transmission circumferences 10, this time three times smaller than the fixed circumference 9. Accordingly, as for the previous mechanisms, by turning the transmission circumferences 10 about the fixed circumference 9, and following a point 14 located on it, it is possible to obtain a shape similar to that of a cloverleaf and which may be beneficial in an engine application.

Figure 11:
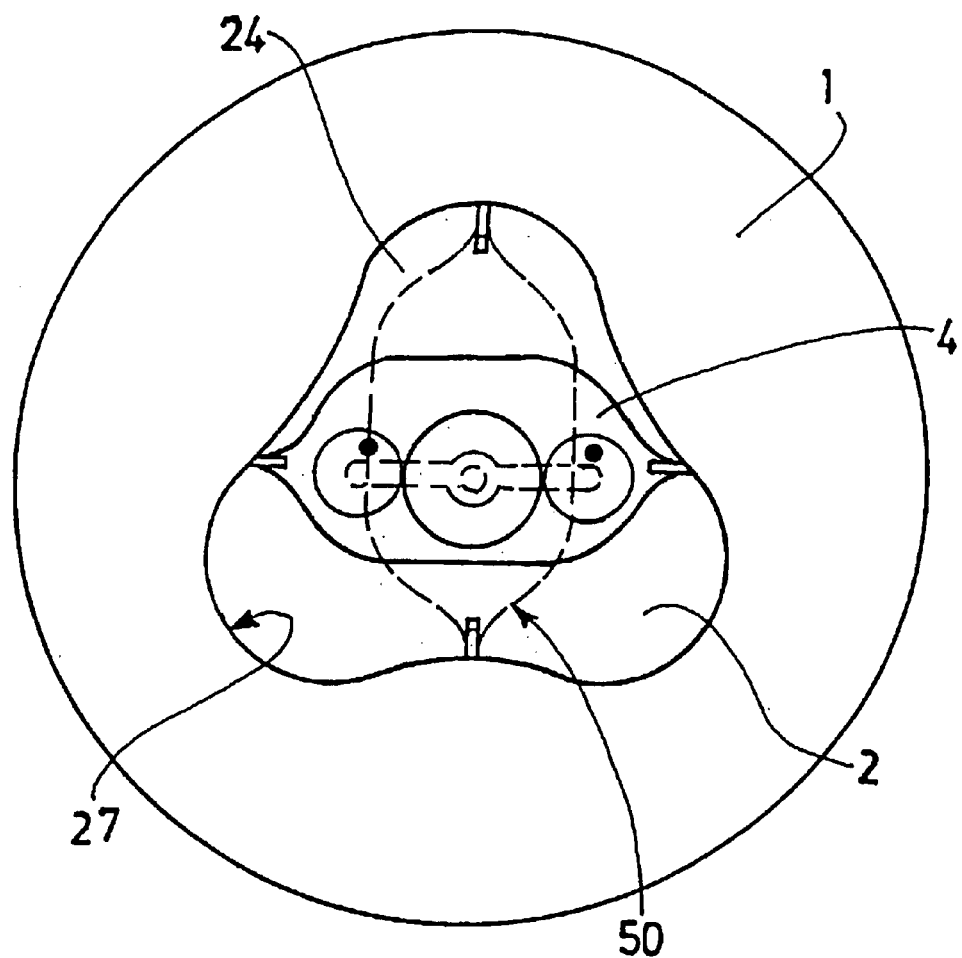
FIG. 11 is the materialization of an engine whose cylinder has a similar shape to that obtained in the previous figure. Here, the blade is in the explosion position and at the end of inlet.

FIG. 11 is the materialization of an engine whose cylinder has a similar shape to that obtained in the previous figure. Here, the blade 4 is in the explosion and end of inlet position because a part on one side of the blade 4 is minimized whereas, conversely, an opposite part faces a widest cylinder part. The dotted lines of the figure represent the successive movements of the blade 4.

Figure 12:
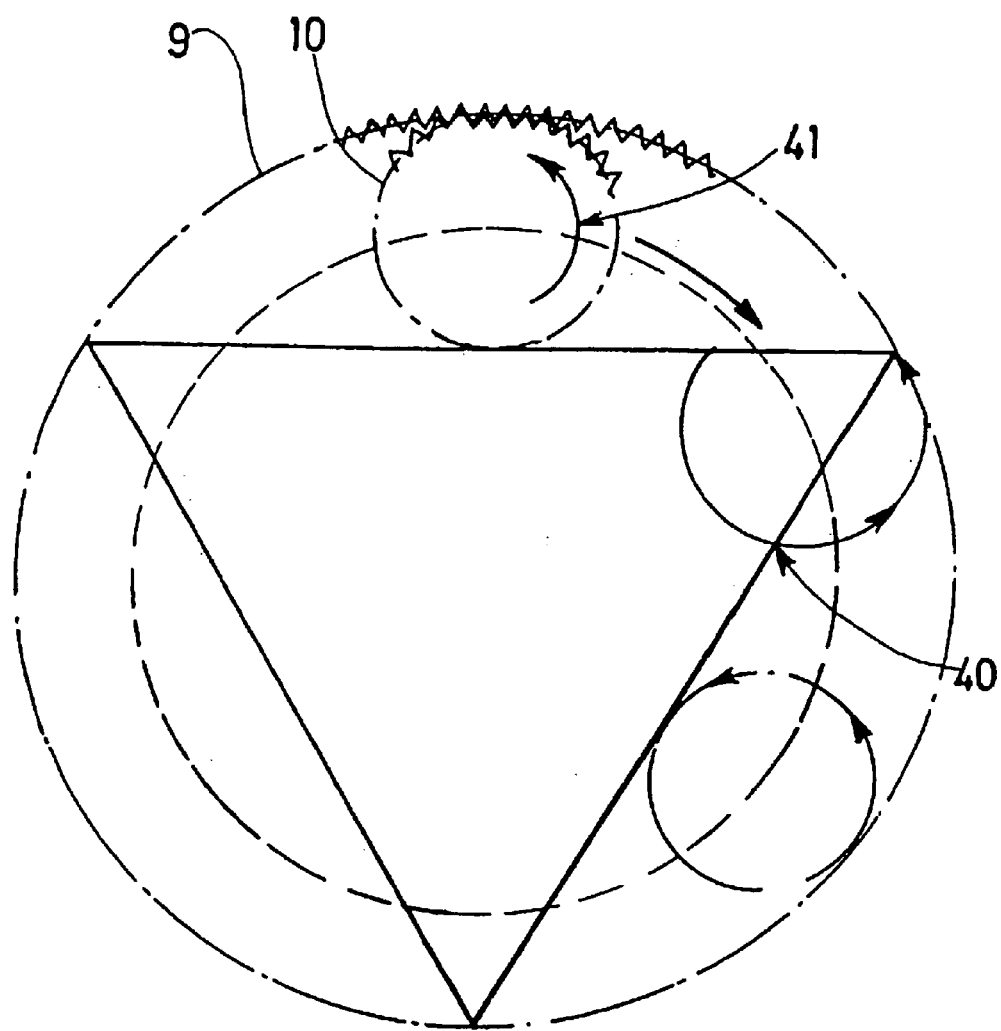
FIG. 12 shows the movement of a point on a transmission circumference rotating within a circumference. In this case, the inside circumferences is three times smaller.

FIG. 12 shows the movement of a point situated on transmission circumference 10 that, this time, turns within a fixed circumference 9. Here, the transmission circumference 10, located on the inside of the fixed circumference 9, is three times smaller than the fixed circumference 9. The resulting movement of a chosen point 40 on the circumference 10 chosen on the inside, because this is the circumference it will now be rotating, after one complete revolution, that is, three revolutions about itself, will be similar to the form of a triangle. Note that the rotation movement of the inner circumference 10, because it follows the outer circumference 9, will be in the opposite direction to a swiveling thereof (see arrow 41). Therefore, it is important to distinguish between rotation and swiveling.

Figure 13:
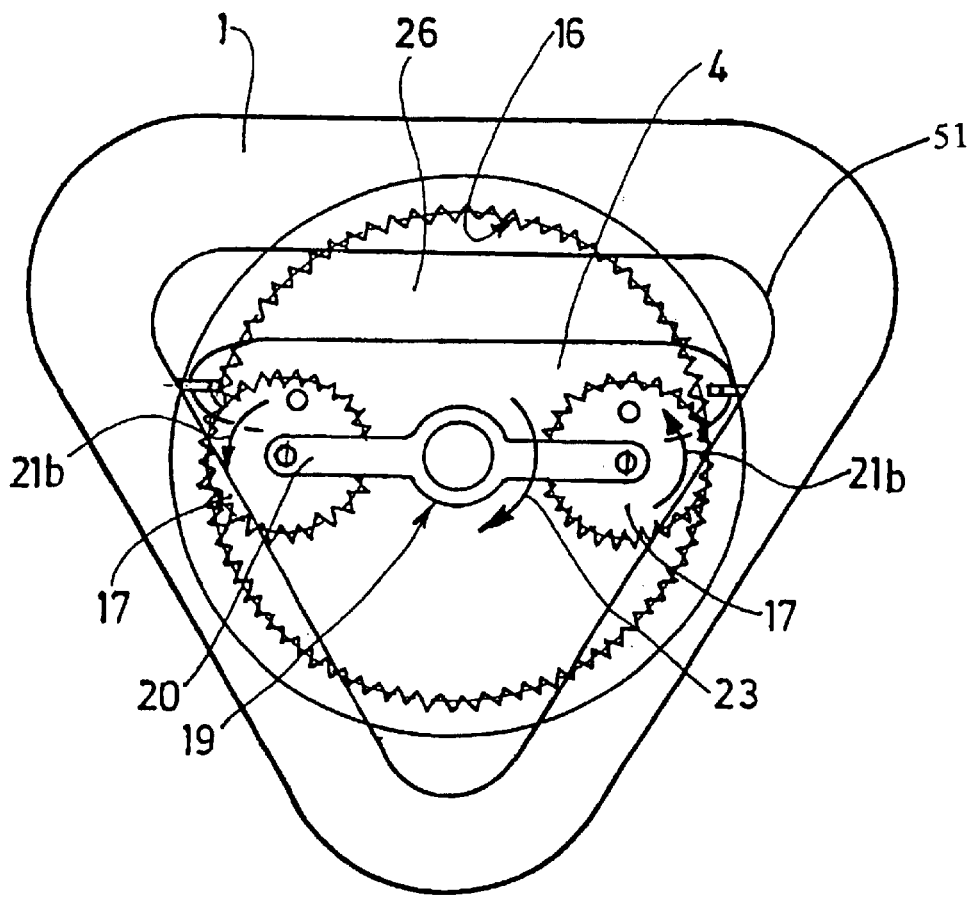
FIG. 13 materializes the geometry depicted in the previous figure, resulting in the construction of a triangular engine. The engine has been placed in the explosion and end of inlet phase.

FIG. 13 materializes the geometry explained in the previous figure and which leads a triangular engine. The engine has been placed in the explosion and end of admission phase. As in the previous embodiments, the transmission kingpins 20, attached to a crankshaft 19, arranged to rotate (as shown by arrow) in the side of the engine, support at either end transmission gears 17. But here, however, instead of being inserted into an external supporting gear, they are inserted into a supporting gear 16 of the internal gear type, reversing the swiveling direction (see arrow 21b). Here, the engine parts have been placed in their explosion phase. The combustion chambers 26 are therefore between the triangular cylinder 51 sides and the blade 4, the blade being parallel to it.

Figure 14:
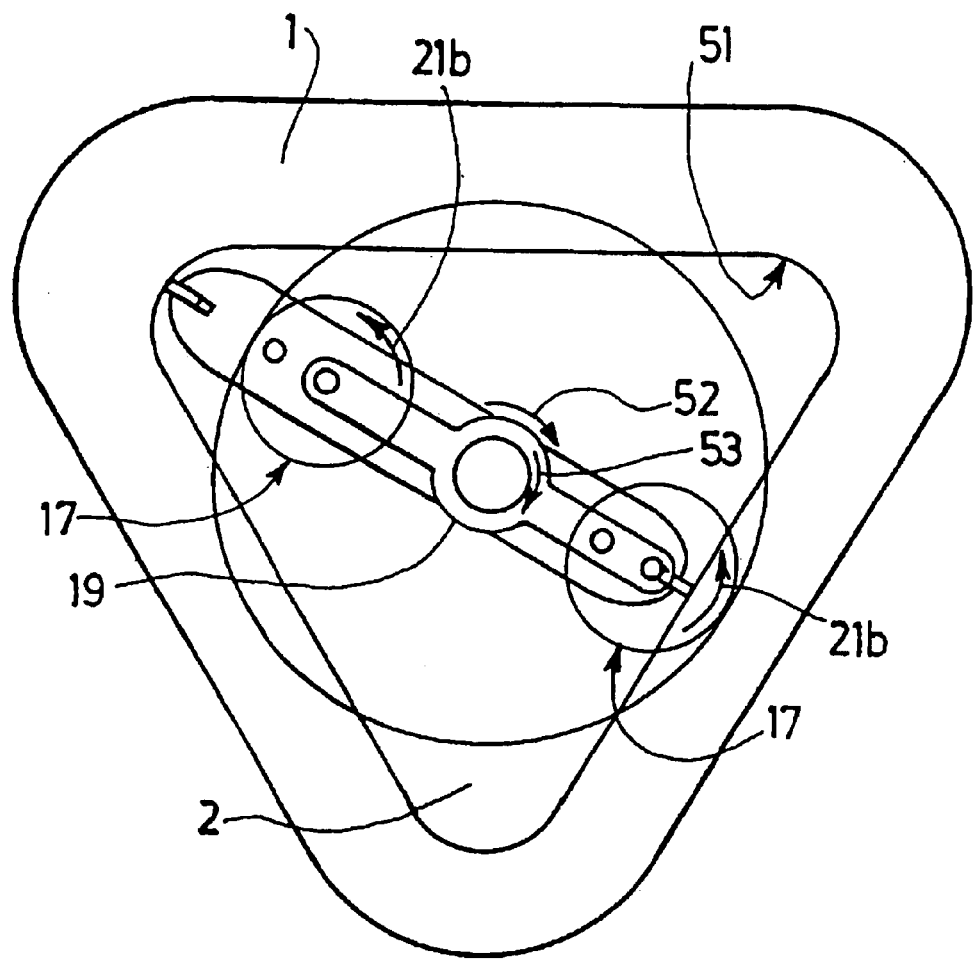
FIG. 14 is similar to the previous figure but the engine is shown in the expansion phase.

The FIG. 14 refers back to the previous figure but in which the engine is in the expansion phase, in this case midway between two explosions. It will be seen that the parts between the blade and the triangular cylinder 51 have been enlarged under the force of the explosion. It will be seen that the direction of rotation of the blade (see arrow 52) is similar to that of the supporting crankshaft (see arrow 53).

Figure 15:
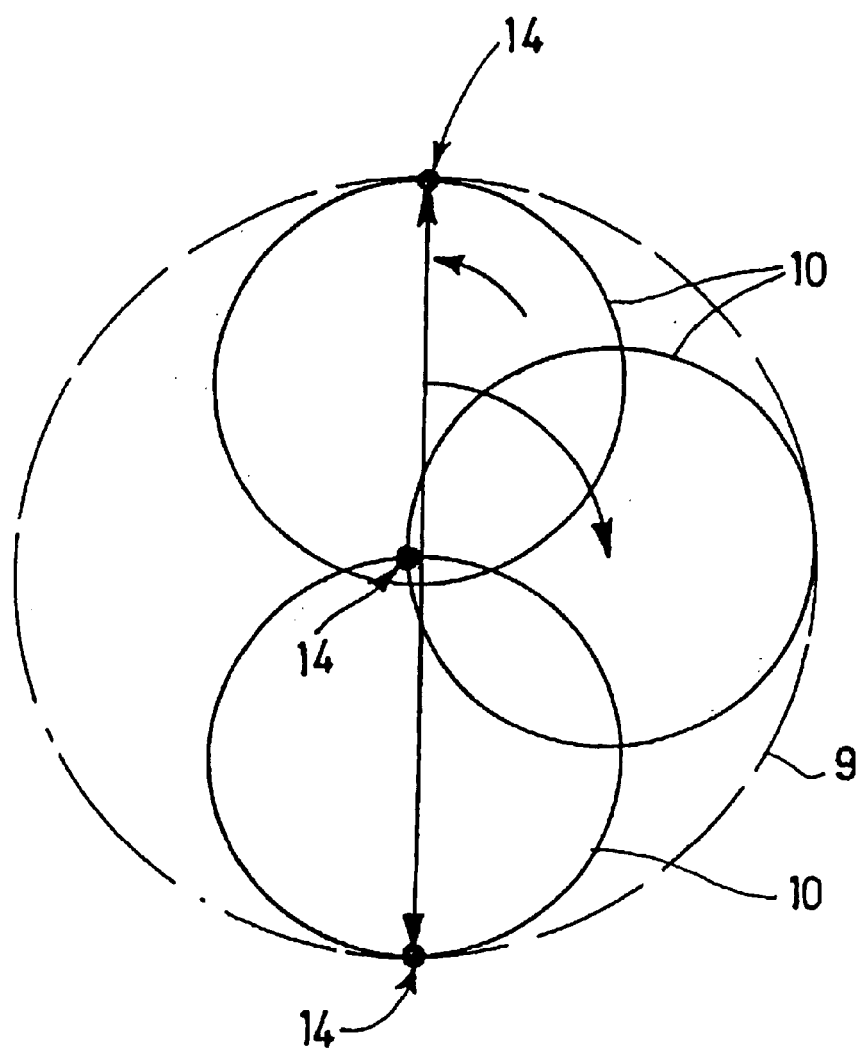
FIG. 15 shows the rectilinear path covered by a circumference whose magnitude is twice as small as the outside circumference, within which it swivels.

FIG. 15 shows a rectilinear path taken by a point 14 located on the transmission circumference 10 whose magnitude is twice as small as the fixed circumference 9 within which it swivels about itself.

Figure 16:
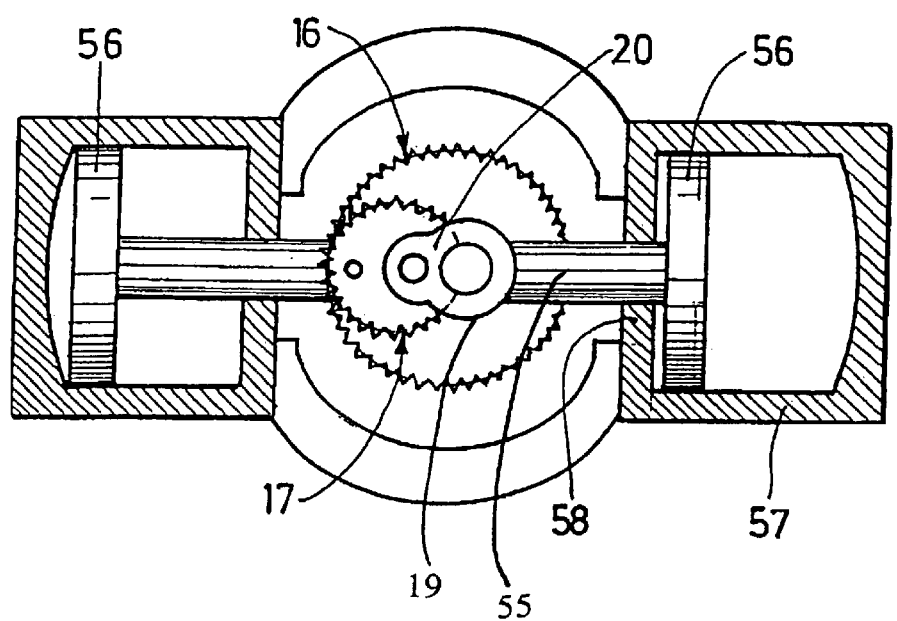
FIG. 16 is a materialization of FIG. 14. It will be seen that a double-head piston has been attached to the transmission gear.

FIG. 16 is a materialization of FIG. 14. Indeed, it is assumed that the transmission gear 17 mounted to rotate at the end of a supporting kingpin is being used. It is also assumed that the supporting kingpin is attached rigidly to the supporting crankshaft 19. The transmission gear 17 is inserted in a supporting gear 16 of the internal type whose size is twice as large as its own. A transmission shaft, connected to transmission gears 17, is then connected to a crankshaft, each end of which is provided with a piston 56. The rectilinear to and fro movement of the transmission shafts will result in the successive in and out movements of the pistons 56 in their respective cylinders 57. In addition, it is a way of isolating a lower part of each cylinder 57 so as to produce within it the low compression needed for the two-stroke engines. This is made possible by the solely rectilinear movement of the transmission shafts. Therefore, it allows the reproduction of the operation of two-stroke engines, supplied with gas alone.

Figure 17:
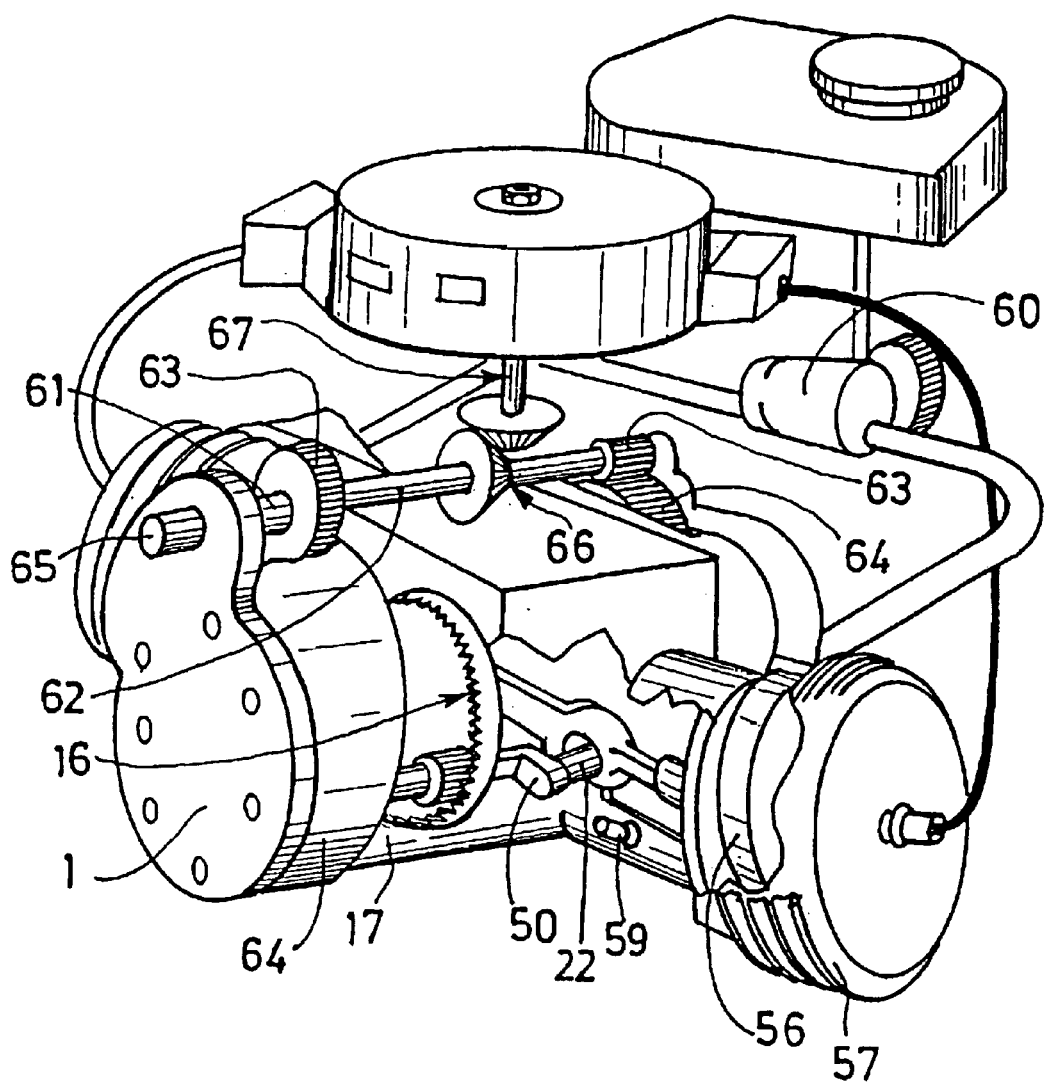
FIG. 17 is a more detailed representation of the previous figure including systems of valves, drive calibration, electricity, etc.

FIG. 17 is a more detailed representation of the previous figure including a system of valves 59, carburation, drive calibration, and electricity, etc. More specifically, as far as driving is concerned, a more complete embodiment of the invention suggests that the driving of the engine from one side would result in several stoppages, both in terms of the driving of the parts towards the outside and, on starting, from the outside toward the inside. Therefore, when it is intended to assemble the engine in three dimensions, it is well worth doubling the system on each side, to some extent, that is, to install two transmission crankshafts and kingpins, and connect them indirectly and by virtue of a balancing shaft 62. This balancing shaft 62, arranged to rotate inside the engine, will be provided with a gear 63 at either end, inserted into respective gears 64 placed on the crankshaft. This balancing shaft 62 may also be considered as a way of conveying energy to the outside by an end thereof. A pivot gear 66 can also be placed on the balancing shaft 62 and be inserted into an ignition shaft 67 placed on a stem at the end of which components needed for ignition are installed. The lower inlet chambers can be provided with the valves 59 and connected to the carburetion system 60 thus producing two-stroke type carburetion, but on gas alone.

Figure 18:
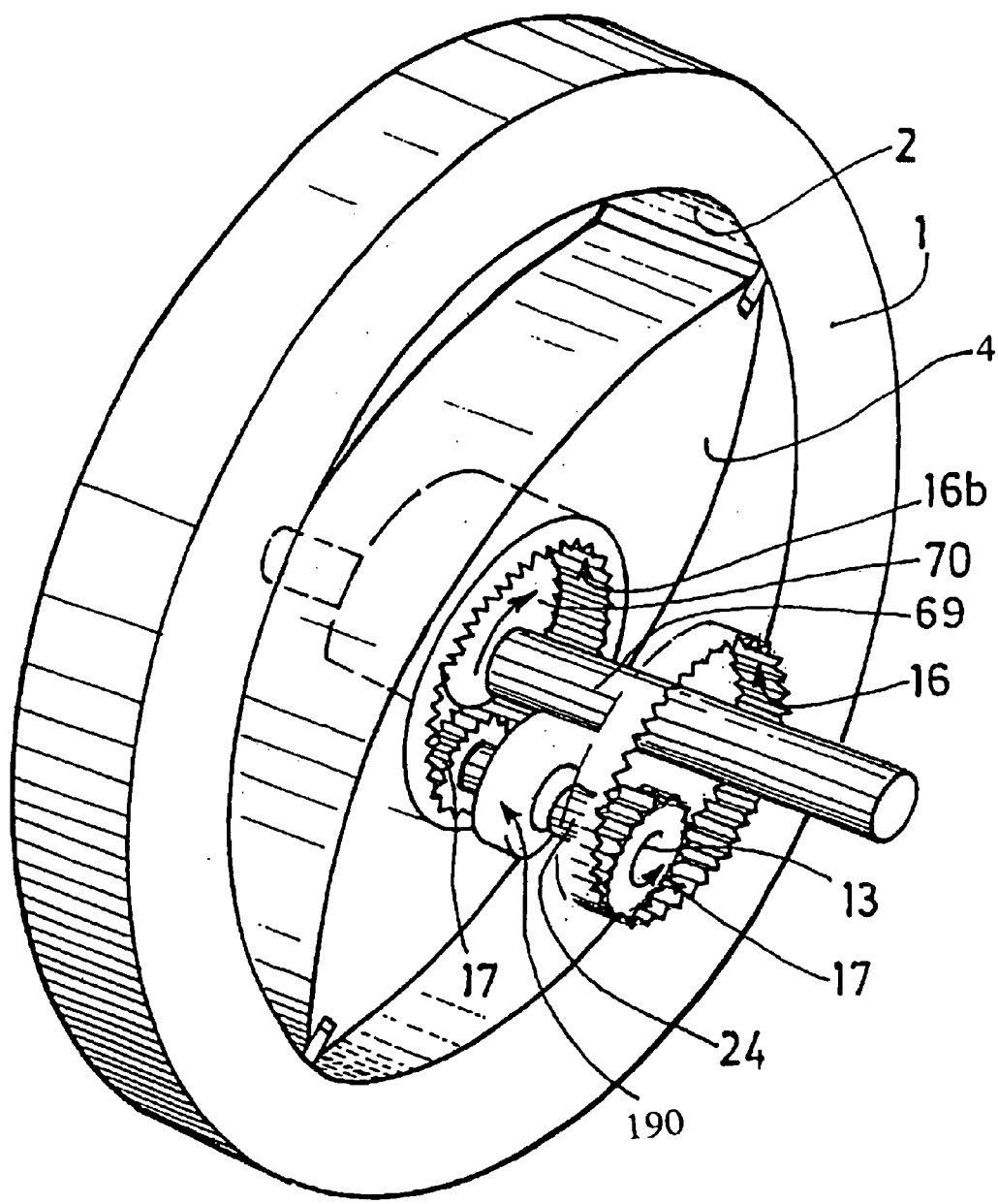
FIG. 18 and the following represent embodiments of multi-inking engines including the production and the use of a crankshaft among the means of transmission.

FIG. 18 represents a multiple-inking engine one of the two inkings of which is a crankshaft 69 while the other is a set of gears. The crankshaft 69, provided with an eccentric 70, is inserted to rotate in a compression device such as a blade 4. An additional transmission kingpin 190 is mounted on the crankshaft 69 at 180 degrees from the direction of the eccentric 70. A transmission shaft 24 is inserted to rotate in the transmission kingpin 190 and will be attached rigidly at either end to transmission gears 17. The transmission gears 17 on the outside will be inserted into a supporting gear 16 of the internal type, arranged rigidly in the side of the engine. As far as the gear on the other side of the transmission shaft 24 is concerned, it will be inserted into a side supporting gear 16b of the internal type, arranged rigidly in the side of the blade. The side supporting gear 16b of the internal type will be arranged rigidly in the blade side. The dimensions of the two assemblies will be calculated so that the inside gear assembly is twice as small as the outer assembly. Accordingly, the movement of the blade 4 will be induced in the same direction as that the crankshaft 69 but at a speed two times slower than the crankshaft 69. Indeed, when the crankshaft 69 turns under the effect of the insertion of the outer transmission gears 17 into the outer supporting gear, the transmission shaft 24 will turn in the opposite direction (see arrow), causing a reduction of the speed. The opposite part of the transmission shaft, provided with the internal transmission gear, will cause speed reduction, driving the internal supporting gear connected rigidly on the blade side and, accordingly the blade 4, but at a lower speed. In this way, the blade will describe the desired movement, obtained by the initial means indicated in the previous figures.

Figure 19:
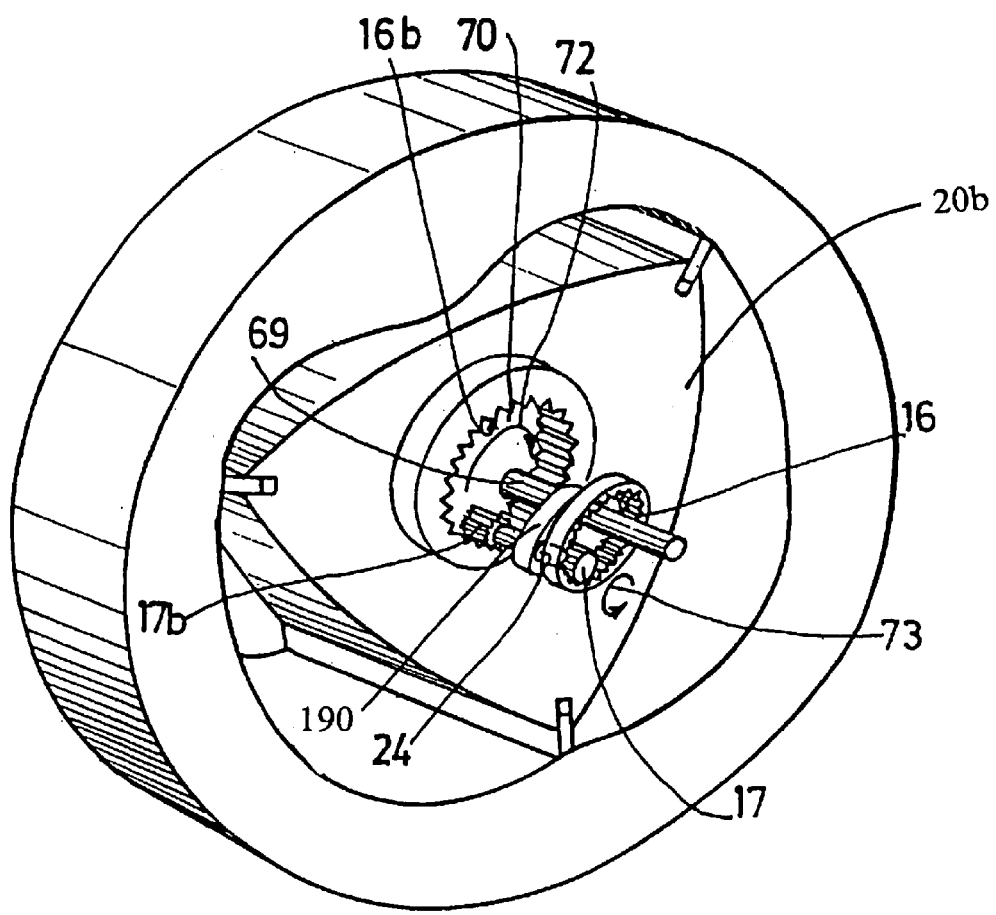
FIG. 19 represents the construction of a figure of eight engine, using the same process.

FIG. 19, obtained through a similar process to that of the previous figure, produces a figure of an eight engine. Indeed, the eccentric 70 of the crankshaft 69 can be connected to rotate, in this case, with a triangular piston 20b, and arranged to drive a transmission shaft 24 with a transmission kingpin 190 placed at 180 degrees from the direction of the eccentric 70. Then, this transmission shaft 24 can be provided at either end with a transmission gear 17. The outer gear will be inserted into an inner supporting gear 16, arranged rigidly in the side of the engine. A second transmission gear 17b of the transmission shaft 24 will be inserted into an inner gear 16b arranged rigidly in the side of the triangular piston 20b. This is a way of controlling the movement of the triangular piston 20b compared to the movement of the crankshaft 69. Naturally, once again, it will be necessary to calibrate the two sets of gears so that the rotation of the triangular piston 20b is twice as slow as that of the crankshaft 69 if the piston movement is to comply with the figure of an eight shape of the cylinder. In this way, all the parts of the piston surface will activate the crankshaft 69, either through the crankshaft itself, directly, or through the transmission kingpin.

Figure 20:
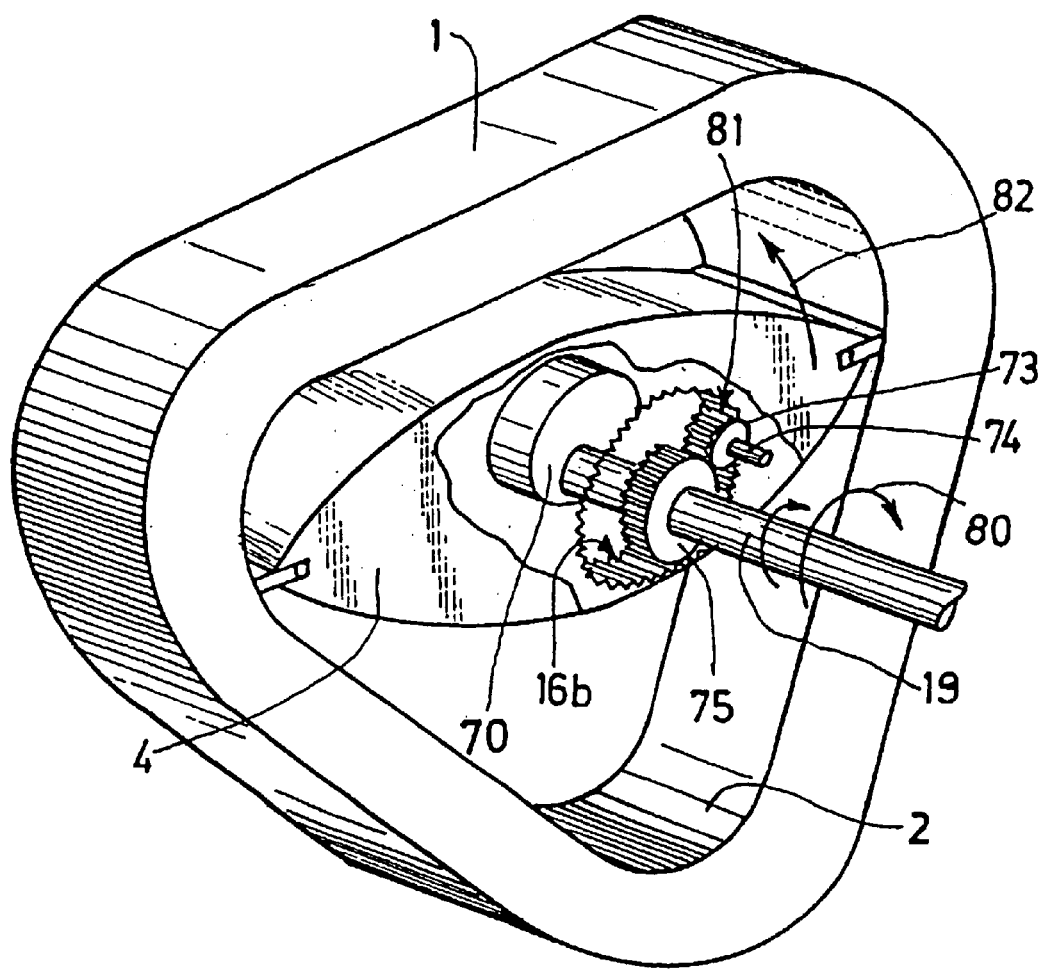
FIG. 20 represents a multiple-transmission and reversed engine in which the movement of the blade is in the opposite direction to the crankshaft. This reversal is obtained by a supporting pinion. This is a reversed manner of producing a triangular engine.

FIG. 20 represents a multiple-transmission inverse engine in which the movement of the blade 4 is contrary to that of the crankshaft 69. This reversal is used by having an inner gear on one side of the transmission shaft and an outer gear on the other side. In an inverse manner, this is a way of obtaining a triangular engine. To do this, the crankshaft 69 is fitted with an eccentric 70 and is arranged to rotate in the housing of the engine. Then, the blade 4 is coupled to turn partly about this eccentric 70. Subsequently, on the crankshaft, a drive gear 75 is mounted rigidly, coupled with a reversal gear 73, which is arranged rigidly on a reversal shaft mounted to rotate in the engine housing. The inverse part of this gear will be coupled with a transmission gear 16b of the internal type, mounted rigidly in the side of blade 4. In this way, it will be possible to calibrate the gears so that the blade 4 turns twice as slow as the eccentric 70; the two movements will be in the opposite directions. Indeed, the movement of the crankshaft (arrow 80) reverses the reversal gearing of reversal gear 73 (see arrow), which, in turn, will cause the blade 4 to be moved in the opposite direction (see arrow). The result of these two contrary movements will enable the blade 4 to skim over the shape of the triangular engine while holding each end of the blade constantly pressed against the wall of the cylinder 2.

Figure 21:
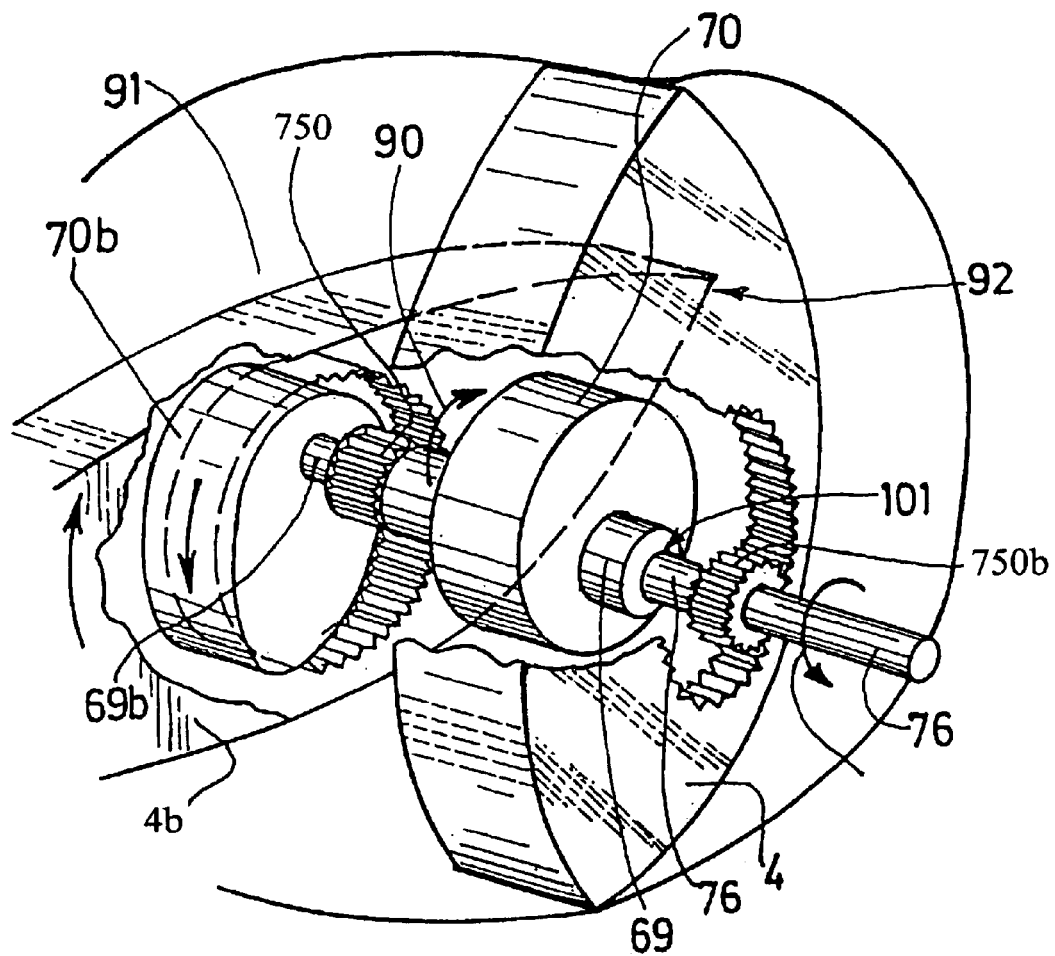
FIG. 21 shows an engine in which two complete systems have been reversed, turning in the opposite direction to one another. Accordingly, one system becomes equipment to the reversal pinion of the other and vice versa. This manner of operating saves on many parts and increases the torque of the engine.

FIG. 21 represents an engine whose two systems drive one another. Accordingly, one system becomes equivalent to the pinion of the other, saving on a number of parts and increasing engine torque. Moreover, according to these explanations, we believe that the systems can be designed in such a way that the speeds of the parts complete one another. Accordingly, it could be assumed that a first crankshaft 69 on which an eccentric 70 is mounted with a blade drive gear 750, or a triangular piston, could be used. We could then imagine that the first crankshaft 69 is pierced through end to end and in turn is traversed by a second crankshaft 69b. The second crankshaft 69b will also be provided with an eccentric 70b. However, part of the second crankshaft 69b will be thinned so that it passes through the first crankshaft 69 over a length 76 thereof. A transmission gear 75ob of the second crankshaft 69b, in this case, will be attached rigidly to it, but on the other side of the eccentric 70 of the first crankshaft 69. Accordingly, each of the two systems, consisting of the transmission gears of one of the crankshafts and the eccentric of the other, will be suitable for coupling to a blade 4. In each case, the blade will be mounted on one of the two eccentrics 70, 70b and internal gears will be inserted into the opposite crankshaft transmission gears. Accordingly, the movement of one system will drive that of the other. If the first crankshaft 69 is assumed to be rotating in a first direction (arrow 90), it will induce the rotation of the blade in the same direction. However, the rotation of the drive gear in the same direction will result in the movement of the second blade but twice as slowly. In turn, the second moving blade will drive the eccentric of its own crankshaft twice as fast and the latter, with its gearing, twice as small as the first blade transmission gearing, will drive it twice as slow in total harmony with the movement of its own crankshaft. In this way, not only does it reduce the number of parts, but also increases the torque. For each blade 4, it will be seen that the energy is captured by the parts, at two places, for transmission toward the outside.

Figure 22A:
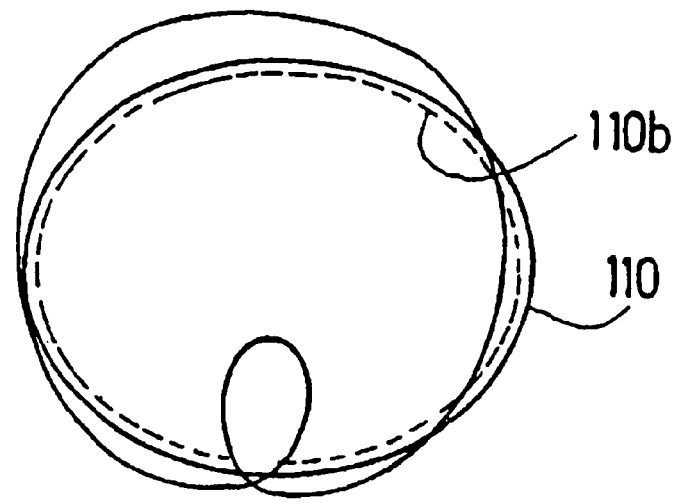
FIG. 22 shows concave shapes obtained depending on whether the blade attaching point is on the transmission gears, inside the circumference lines.
Figure 22B:
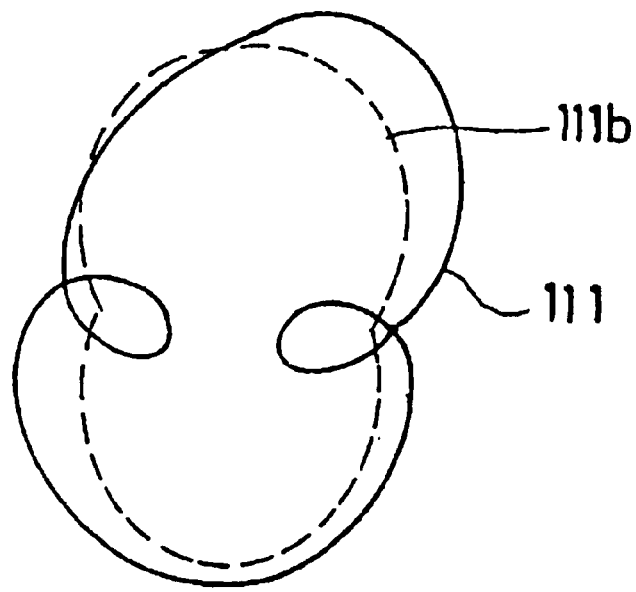
Figure 22C:
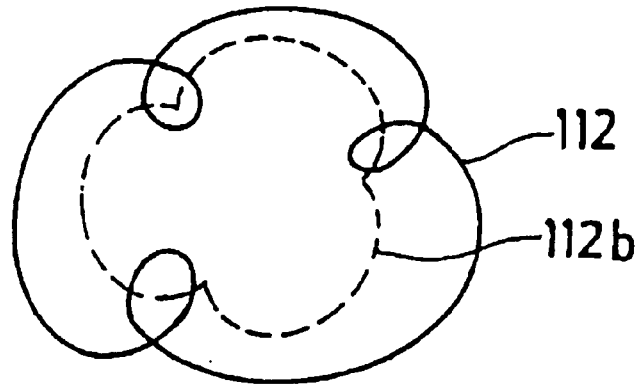
Figure 23A:
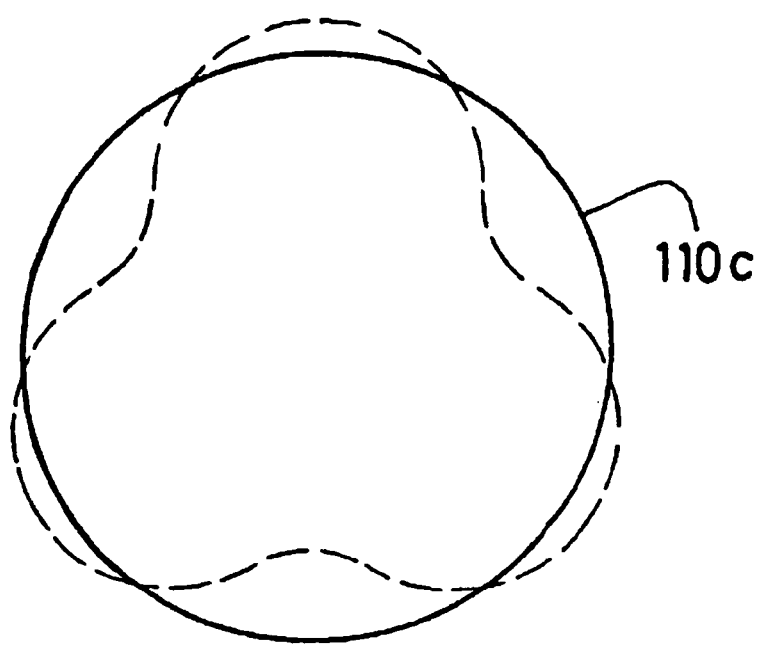
FIG. 23 represents convex shapes obtained by placing the blade attachment point outside the circumference of the transmission gears.
Figure 23B:
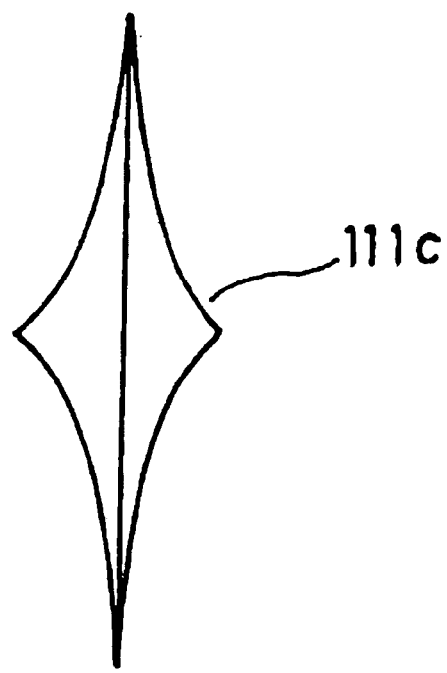

FIG. 22 represents concave shapes 110, 111 and 112 obtained depending on whether the attachment points of the blades are on the transmission gears within the circumference lines, while FIG. 23 represents concave shapes 110c and 111c obtained by placing the attachment points of the blades outside the circumferences of the transmission gears. The movement exceeds that of the shape originally obtained, both on the outside and the inside.

Figure 24:
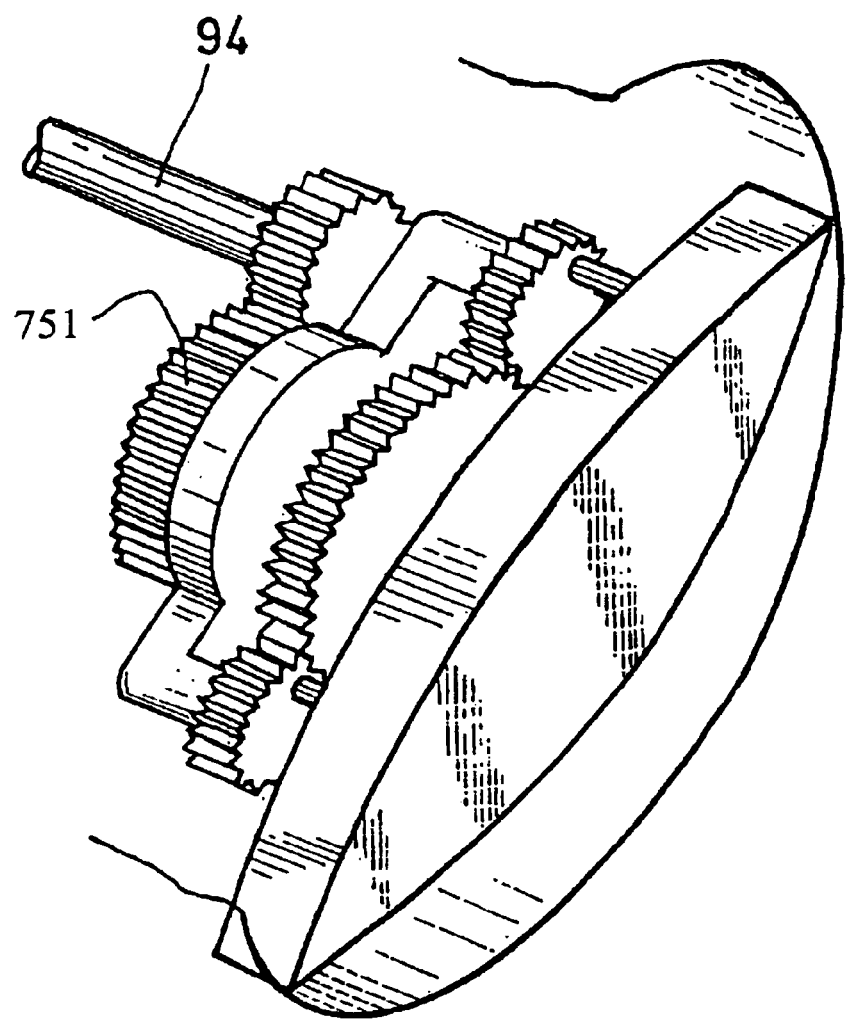
FIG. 24 shows an engine whose transmission, towards the outside, is obtained from a shaft inserted into the support shaft.

FIG. 24 shows an engine whose transmission toward the outside is obtained from a shaft inserted into the support shaft. Indeed, on the crankshaft, there is an external drive gear 751 which will be inserted into an externalization gear, arranged rigidly and firmly on a shaft 94 mounted to rotate through the engine housing and conveying power to the outside.

Figure 25:
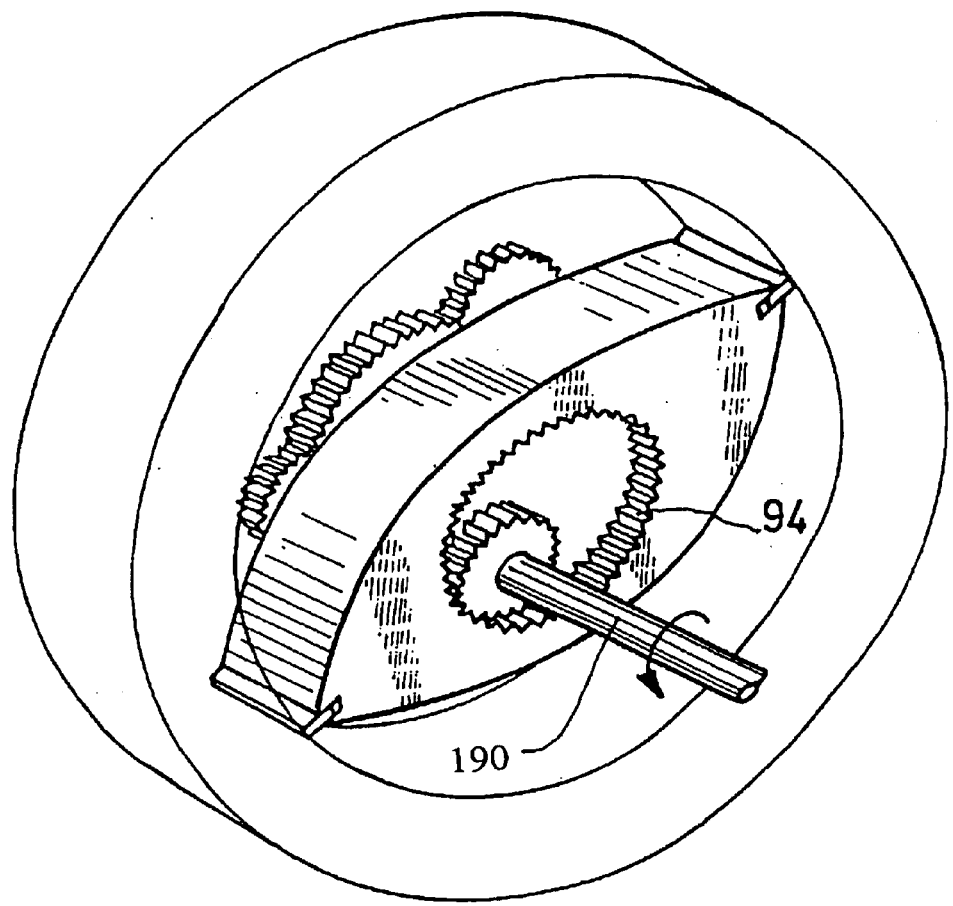
FIG. 25 shows an engine whose transmission is generated directly from the blade, which is inserted into a central shaft by means of an external gear.

FIG. 25 shows an engine whose transmission is generated directly from the blade, which is inserted into a central shaft 190 by means of an internal gear 94.

Figure 26:
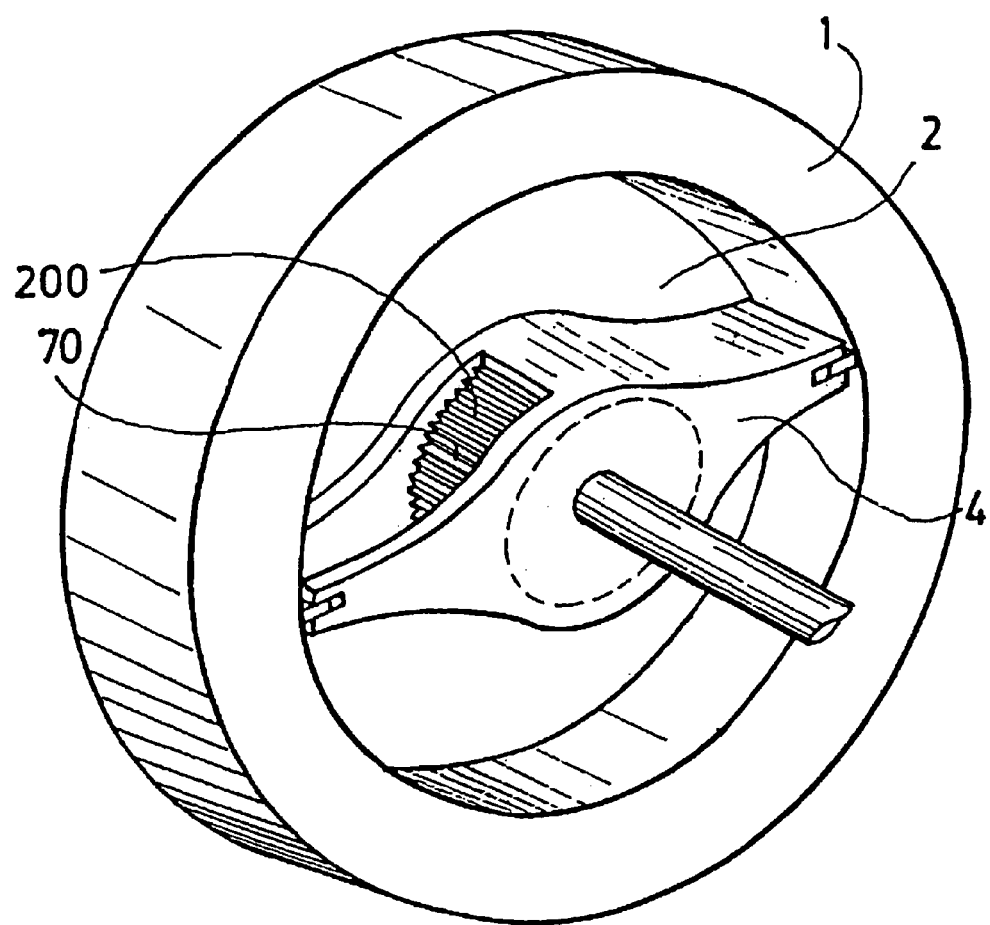
FIG. 26 shows how to take advantage of these mechanisms by cutting out the blade so that the crankshaft surface is directly exposed to the effect of explosion.

FIG. 26 shows how to take advantage of these mechanisms by cutting out the blade 4, or the triangular piston, so that the surface of the crankshaft eccentric 70 is directly exposed to the explosion. The same cut-outs can be made in the triangular piston.

What is claimed is:

1. A multiple transmission energetic machine, comprising:
    an engine block containing a cylinder into which a blade is inserted so as to partly rotate; and
    at least one assembly comprising:
    a double-part supporting kingpin, installed to rotate in the engine block and each end of which is provided with a shaft;
    a supporting gear, on which is mounted each shaft, said supporting gear being rigidly connected to said engine block;
    transmission gears rotately inserted into said supporting gear, said transmission gears being mounted at each of said supporting kingpin shaft to rotate inside of said engine block and said transmission gears being provided, on a diameter thereof, with a means for attaching the transmission gears to the blade; and
    a compression device including a piston or said blade attached to said transmission gears so as to rotate partly in said cylinder.

2. The multiple transmission energetic machine according to claim 1, wherein said transmission gears have a diameter twice as small as a diameter of the supporting gear, said piston being triangular in shape and said cylinder being in a form of a figure 8.

3. The multiple transmission energetic machine according to claim 1, wherein said transmission gears have a diameter three times as small as a diameter of the supporting gear, said piston being triangular in shape and said cylinder being in a form of a cloverleaf 4. The multiple transmission energetic machine according to any one of claim 1, 2 or 3, wherein said shafts are rigidly connected to the transmission gears and are inserted to rotate in ends of the supporting kingpins.

5. The multiple transmission energetic machine according to claim 1, wherein said transmission gears have a diameter three times as small as a diameter of the supporting gear, said supporting gear being an internal gear, said blade producing an almost triangular movement, and said cylinder being almost triangular in shape.

6. A multiple transmission energetic machine, comprising:
- a machine housing containing a cylinder into which a crankshaft is inserted to rotate, said crankshaft being provided with an eccentric;
- a double-part supporting kingpin mounted rigidly to the eccentric of the crankshaft;
- a transmission gear provided at each end of the kingpin with transmission shaft means;
- supporting gears coupled to said transmission gears outside the transmission shaft means; and
- a compression means including a piston or a blade arranged to rotate partially in said cylinder and attached to said transmission shaft means.

7. The machine according to claim 6, wherein said piston is triangular in shape and said cylinder is in a form of a figure of 8.

8. The machine according to any one of claim 1 or 6, having one of a convex movement or a concave movement.

9. A multiple transmission energetic machine comprising:
- a machine housing containing a cylinder;
- a crankshaft with an eccentric inserted to rotate in said cylinder;
- a blade arranged to turn partly in said cylinder;
- a supporting kingpin installed rigidly relative to the crankshaft eccentric and provided at two ends with a transmission shaft;
- transmission gears mounted on each end of each transmission shaft;
- a supporting gear coupled to the transmission shafts of the transmission gears on a first side and to a transmission gear of an internal type on the blade side; and
- a transmission gear of the blade coupled with a supporting gear, said blade transmission gear of the blade being twice as large as said transmission gears;
- wherein said cylinder is almost circular and an almost rotary movement of said blade takes place, and wherein supporting points of said supporting gear are displaced from a line between a center of said blade and a tip of said blade.

10. The machine according to claim 9, wherein a size of the crankshaft transmission gears is one-third compared to a size of the blade induction supporting gear and said cylinder is triangular in shape.

11. A multiple transmission energetic machine comprising:
- a machine housing comprising a first cylinder and a second cylinder;
- a first crankshaft mounted to rotate in said machine housing and provided with a first eccentric and first transmission gears, said first crankshaft being perforated through from one end to another so as to allow a passage for a second crankshaft provided with a second eccentric and second transmission gears;
- a first blade arranged to rotate in said first cylinder and provided with transmission gears arranged rigidly in a side thereof, said first blade being connected to said second transmission gears; and
- a second blade mounted to rotate in said second cylinder, on the second eccentric of the second crankshaft;
- wherein said second blade is coupled by transmission gear of an internal type to said first transmission gears.

* * * * *